(12) United States Patent
Eckhardt et al.

(10) Patent No.: US 11,267,220 B2
(45) Date of Patent: Mar. 8, 2022

(54) MULTILAYER PRESSURE-SENSITIVE ADHESIVE ASSEMBLY

(71) Applicant: 3M INNOVATIVE PROPERTIES COMPANY, St. Paul, MN (US)

(72) Inventors: Doreen Eckhardt, Dormagen (DE); Regina Sikora, Neuss (DE); Jan U. Wieneke, Dusseldorf (DE); Jan D. Forster, Aachen (DE); Kerstin Unverhau, Neuss (DE); Frank Kuester, Dusseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 778 days.

(21) Appl. No.: 14/443,426

(22) PCT Filed: Nov. 15, 2013

(86) PCT No.: PCT/US2013/070240
§ 371 (c)(1),
(2) Date: May 18, 2015

(87) PCT Pub. No.: WO2014/081623
PCT Pub. Date: May 30, 2014

(65) Prior Publication Data
US 2015/0307751 A1 Oct. 29, 2015

(30) Foreign Application Priority Data

Nov. 23, 2012 (EP) .................................. 12194121

(51) Int. Cl.
| | | |
|---|---|---|
| C09J 7/38 | (2018.01) | |
| C09J 7/26 | (2018.01) | |
| C09J 133/08 | (2006.01) | |
| C08K 7/22 | (2006.01) | |
| B32B 5/18 | (2006.01) | |
| B32B 27/08 | (2006.01) | |
| B32B 27/20 | (2006.01) | |
| B32B 27/30 | (2006.01) | |
| B32B 27/34 | (2006.01) | |
| B32B 27/40 | (2006.01) | |
| B32B 27/32 | (2006.01) | |
| B32B 27/06 | (2006.01) | |
| B32B 7/12 | (2006.01) | |
| C09J 7/22 | (2018.01) | |
| C09J 133/06 | (2006.01) | |

(52) U.S. Cl.
CPC .................. *B32B 5/18* (2013.01); *B32B 7/12* (2013.01); *B32B 27/065* (2013.01); *B32B 27/08* (2013.01); *B32B 27/20* (2013.01); *B32B 27/302* (2013.01); *B32B 27/308* (2013.01); *B32B 27/32* (2013.01); *B32B 27/34* (2013.01); *B32B 27/40* (2013.01); *C09J 7/22* (2018.01); *C09J 7/26* (2018.01); *C09J 7/38* (2018.01); *C09J 133/08* (2013.01); *B32B 2264/101* (2013.01); *B32B 2264/102* (2013.01); *B32B 2266/025* (2013.01); *B32B 2266/0221* (2013.01); *B32B 2266/0228* (2013.01); *B32B 2266/0242* (2013.01); *B32B 2266/0278* (2013.01); *B32B 2307/4026* (2013.01); *B32B 2307/542* (2013.01); *B32B 2307/728* (2013.01); *B32B 2307/73* (2013.01); *B32B 2605/00* (2013.01); *C08K 7/22* (2013.01); *C08L 2203/14* (2013.01); *C09J 133/06* (2013.01); *C09J 2301/208* (2020.08); *C09J 2301/302* (2020.08); *C09J 2301/408* (2020.08); *C09J 2301/41* (2020.08); *C09J 2301/412* (2020.08); *C09J 2301/414* (2020.08); *C09J 2400/24* (2013.01); *C09J 2400/243* (2013.01); *C09J 2433/00* (2013.01)

(58) Field of Classification Search
CPC ...... C09J 7/0246; C09J 133/08; C09J 133/10; C09J 2433/00; B32B 5/18; B32B 7/12
See application file for complete search history.

(56) References Cited

U.S. PATENT DOCUMENTS

| | | | |
|---|---|---|---|
| 2,761,419 A | 9/1956 | Mercier | |
| RE24,906 E | 12/1960 | Ulrich | |
| 3,864,181 A * | 2/1975 | Wolinski | C08J 9/04 |
| | | | 156/204 |

(Continued)

FOREIGN PATENT DOCUMENTS

| | | |
|---|---|---|
| DE | 202009013255 | 2/2010 |
| DE | 202010001353 | 4/2010 |

(Continued)

OTHER PUBLICATIONS

Crowley, "A Three-Dimensional Approach to Solubility", May 1966, Journal of Paint Technology, vol. 38, No. 496, pp. 269-280.

(Continued)

*Primary Examiner* — Scott R. Walshon
(74) *Attorney, Agent, or Firm* — Melissa E. Buss

(57) ABSTRACT

The present disclosure is directed to a multilayer pressure sensitive adhesive (PSA) assembly, comprising at least one pressure sensitive adhesive layer and a polymeric foam layer, wherein the pressure sensitive adhesive layer comprises a pressure-sensitive adhesive composition comprising a reaction product of a polymerizable material comprising: a) 2-propylheptyl acrylate as a first monomer; and optionally b) a second monomer having an ethylenically unsaturated group. The present disclosure is also directed to a method of manufacturing such a multilayer PSA assembly.

15 Claims, No Drawings

(56) References Cited

U.S. PATENT DOCUMENTS

| | | | | |
|---|---|---|---|---|
| 4,329,384 | A | 5/1982 | Vesley | |
| 4,330,590 | A | 5/1982 | Vesley | |
| 4,415,615 | A | 11/1983 | Esmay | |
| 4,525,392 | A | 6/1985 | Ishizaki | |
| 4,818,610 | A | 4/1989 | Zimmerman | |
| 4,855,170 | A * | 8/1989 | Darvell | C09J 7/0207 428/144 |
| 5,175,028 | A | 12/1992 | Tanaka | |
| 5,340,613 | A | 8/1994 | Hanzalik | |
| 5,525,376 | A | 6/1996 | Leonard | |
| 5,648,425 | A | 7/1997 | Everaerts | |
| 5,851,663 | A * | 12/1998 | Parsons | C08K 5/0066 428/352 |
| 5,858,097 | A | 1/1999 | Richter | |
| 5,859,081 | A | 1/1999 | Duffy | |
| 6,013,327 | A | 1/2000 | Naruse | |
| 6,033,723 | A | 3/2000 | Kistler | |
| 6,139,613 | A | 10/2000 | Hendrickson | |
| 6,511,742 | B1 | 1/2003 | Mussig | |
| 6,777,079 | B2 | 8/2004 | Zhou | |
| 7,498,078 | B2 | 3/2009 | Husemann | |
| 7,935,383 | B2 | 5/2011 | Zollner | |
| 8,449,962 | B2 | 5/2013 | Prenzel | |
| 8,802,777 | B2 | 8/2014 | Zollner | |
| 2002/0066404 | A1 | 6/2002 | Ueberschar | |
| 2003/0056891 | A1 | 3/2003 | Schroder | |
| 2003/0187170 | A1 | 10/2003 | Burmeister | |
| 2004/0022954 | A1 | 2/2004 | Tsuda | |
| 2007/0163705 | A1 | 7/2007 | Dollase | |
| 2008/0199636 | A1 | 8/2008 | Husemann | |
| 2008/0202662 | A1 | 8/2008 | Husemann | |
| 2008/0206492 | A1 | 8/2008 | Husemann | |
| 2008/0286569 | A1 | 11/2008 | Husemann | |
| 2009/0270577 | A1 | 10/2009 | Beyers | |
| 2010/0137524 | A1 | 6/2010 | Grittner | |
| 2011/0104486 | A1 | 5/2011 | Ma | |
| 2011/0237725 | A1 | 9/2011 | Clapper | |
| 2011/0274843 | A1 | 11/2011 | Grittner | |
| 2011/0281964 | A1 | 11/2011 | Zmarsly | |
| 2011/0315316 | A1 | 12/2011 | Welke | |
| 2012/0029105 | A1 | 2/2012 | Czerwonatis | |
| 2012/0171915 | A1 * | 7/2012 | Bartholomew | C09J 7/0217 442/151 |
| 2014/0147610 | A1 * | 5/2014 | Traser | C09J 11/06 428/40.2 |
| 2014/0154485 | A1 | 6/2014 | Traser | |
| 2014/0367040 | A1 | 12/2014 | Traser | |
| 2015/0079385 | A1 * | 3/2015 | Nishikawa | C09J 7/0221 428/317.3 |

FOREIGN PATENT DOCUMENTS

| | | | |
|---|---|---|---|
| EP | 168636 | 1/1986 | |
| EP | 0259094 | 3/1988 | |
| EP | 0421162 | 4/1991 | |
| EP | 0752435 | 1/1997 | |
| EP | 1167019 | 1/2002 | |
| EP | 1403190 | 3/2004 | |
| EP | 1666554 | 6/2006 | |
| EP | 1757429 | 2/2007 | |
| EP | 2072594 | 6/2009 | |
| EP | 2803711 | 11/2014 | |
| JP | 5-70403 | 3/1993 | |
| JP | 5-70404 | 3/1993 | |
| JP | 7-124510 | 5/1995 | |
| JP | 11-65022 | 3/1999 | |
| JP | 2000-262962 | 9/2000 | |
| JP | 2001-187362 | 7/2001 | |
| JP | 2003-1648 | 1/2003 | |
| JP | 2005-254087 | 9/2005 | |
| JP | 2006-51469 | 2/2006 | |
| JP | 2008/297337 | 12/2018 | |
| WO | WO 1994-03890 | 2/1994 | |
| WO | WO 1996-08319 | 3/1996 | |
| WO | WO 1998-56581 | 12/1998 | |
| WO | WO 1999-28128 | 6/1999 | |
| WO | WO 2000-27940 | 5/2000 | |
| WO | WO 2001-54828 | 8/2001 | |
| WO | WO 2003-018702 | 3/2003 | |
| WO | WO 2005-021670 | 3/2005 | |
| WO | WO 2005-038528 | 4/2005 | |
| WO | WO 2005-113162 | 12/2005 | |
| WO | WO 2008-049804 | 5/2008 | |
| WO | WO 2009-106550 | 9/2009 | |
| WO | 2010/101738 | 9/2010 | |
| WO | WO 2011-038202 | 3/2011 | |
| WO | WO 2011-094385 | 8/2011 | |
| WO | WO 2013-019495 | 2/2013 | |
| WO | WO-2013019492 A1 * | 2/2013 | C08F 220/18 |
| WO | WO 2013-048945 | 4/2013 | |
| WO | WO 2014-186316 | 11/2014 | |

OTHER PUBLICATIONS

International Search Report for PCT International Application No. PCTUS2013/070240 dated Mar. 13, 2014, 3 pages.

* cited by examiner

MULTILAYER PRESSURE-SENSITIVE ADHESIVE ASSEMBLY

CROSS REFERENCE TO RELATED APPLICATIONS

This application is a national stage filing under 35 U.S.C. 371 of PCT/US2013/070240, filed Nov. 15, 2013, which claims priority to European Application No. 12194121.5, filed Nov. 23, 2012, the disclosure of which is incorporated by reference in its/their entirety herein.

TECHNICAL FIELD

The present disclosure relates to a multilayer pressure sensitive adhesive (PSA) assembly, having at least one pressure sensitive adhesive layer and a polymeric foam layer. The present disclosure is also directed to a method of manufacturing such a multilayer PSA assembly.

BACKGROUND

Pressure-sensitive adhesives are adhesives with specific characteristics such as aggressive and permanent tack, adherence with no more than finger pressure, sufficient ability to hold onto an adherend, and sufficient cohesive strength. As applications for pressure-sensitive adhesives have increased substantially in recent years, performance requirements have become increasingly demanding.

While a variety of natural and synthetic polymeric materials have been included in pressure-sensitive adhesives, the use of (meth)acrylic-based polymeric material is widespread due to a number of beneficial properties. In addition to providing the desired degree of adhesion and cohesion, (meth)acrylic-based polymeric materials often can be tailored to provide other desirable characteristics such as elasticity, tackiness, transparency, resistance to light and oxidation, and the like.

(Meth)acrylic-based polymeric materials have been described, for example, in the following patent references: EP Patent Application 2072594 A1 (Kondou et al.), U.S. Pat. No. 5,648,425 (Everaerts et al.), U.S. Pat. No. 6,777,079 B2 (Zhou et al.), and US Patent Application 2011/04486 A1 (Ma et al.).

Patent application US 2009/0270577-A1 discloses a pressure sensitive adhesive comprising a polymeric binder, wherein the polymeric binder has been synthesized from a C10 alkyl (meth)acrylate, and wherein the alkyl group of the C10 alkyl (meth)acrylate is a branched C10 chain having a propyl group as substituent.

From U.S. Pat. No. 4,818,610 (Zimmerman et al.) a pressure-sensitive adhesive tape comprising a plurality of superimposed layers is disclosed, wherein at least one outer layer is a pressure-sensitive adhesive layer. The pressure-sensitive adhesive layer can be obtained from an acrylate-containing polymerizable mixture.

The pressure sensitive adhesive materials known from the prior art do not often provide sufficient tack to various types of substrate, including the so-called LSE, MSE and HSE substrates, i.e. substrates having respectively a low surface energy, a medium surface energy and a high surface energy. In particular, the peel force resistance on these challenging-to-bond substrates, particularly the LSE and MSE substrates, do often not fulfill the requirements, especially under environmental stress like altering temperatures and humidity.

This deficiency may partly be overcome by the addition of higher amounts of tackifiers. However, the excessive use of tackifiers may often detrimentally affect critical characteristics of pressure sensitive adhesives such as e.g. shear resistance and cohesive strength, and may raise the glass transition temperature of the corresponding adhesive. Furthermore, tackifiers may migrate into the substrate to which the adhesive tape is bonded and may lead to an undesired colour change or reduction of stability.

Another problem of tackified pressure-sensitive adhesives containing conventional (meth)acrylic-based polymeric materials is that these formulations may appear cloudy, demonstrating a loss in the characteristic transparency of the conventional (meth)acrylic-based elastomeric materials. The cloudiness is an indication of limited or incomplete compatibility of the tackifier and the elastomeric material. The reduced compatibility can lead to a degradation of adhesive properties, as evidenced by a loss of tack or reduced peel adhesion on aging.

Without contesting the technical advantages associated with the pressure sensitive adhesives known in the art, there is still a need for multilayer PSA assembly having improved and versatile adhesion characteristics, in particular with respect to peel forces and shear resistance on various types of difficult to adhere surfaces, such as in particular LSE and MSE substrates.

Other advantages of the multilayer pressure sensitive adhesive (PSA) assembly and methods of the invention will be apparent from the following description.

SUMMARY

According to one aspect, the present disclosure relates to a multilayer pressure sensitive adhesive (PSA) assembly, comprising at least one pressure sensitive adhesive layer and a polymeric foam layer, wherein the pressure sensitive adhesive layer comprises a pressure-sensitive adhesive composition comprising a reaction product of a polymerizable material comprising:
  (a) 2-propylheptyl acrylate as a first monomer; and optionally
  (b) a second monomer having an ethylenically unsaturated group.

In another aspect, the present disclosure is directed to a method for manufacturing a multilayer pressure sensitive adhesive film as above-described, whereby the pressure sensitive adhesive layer and the polymeric foam layer are superimposed on one another.

In still another aspect, the present disclosure relates to the use of a multilayer pressure sensitive adhesive film as above-described for the bonding, via its pressure sensitive adhesive layer, to a low surface energy substrate, a medium surface energy substrate and/or a high surface energy substrate.

DETAILED DESCRIPTION

According to a first aspect, the present disclosure relates to a multilayer pressure sensitive adhesive (PSA) assembly, comprising at least one pressure sensitive adhesive layer and a polymeric foam layer, wherein the pressure sensitive adhesive layer comprises a pressure-sensitive adhesive composition comprising a reaction product of a polymerizable material comprising:
  (a) 2-propylheptyl acrylate as a first monomer; and optionally
  (b) a second monomer having an ethylenically unsaturated group.

It has surprisingly been found that a multilayer PSA assembly comprising a pressure sensitive adhesive layer having a pressure-sensitive adhesive composition of the before mentioned kind combines high peel forces with high shear force resistance on various types of substrates. In particular, such advantageous properties may be obtained on substrates as diverse as low surface energy, medium surface energy and/or high surface energy substrates. This is particularly surprising finding as LSE, MSE and HSE substrates typically exhibit completely different surface chemistry and energy.

Multilayer PSA assemblies according to the present disclosure, and in particular the dual layer polymeric foam tape assemblies, are particularly advantageous when compared to single-layer pressure sensitive adhesives, in that adhesion (quick adhesion) can be adjusted by the formulation of the pressure sensitive adhesive layer (also commonly referred to as the skin layer), while other properties/requirements of the overall assembly such as application issues, deforming issues and energy distribution may be addressed by appropriate formulation of the polymeric foam layer. In some aspects, the multilayer PSA assemblies as disclosed herein are smooth, homogenous and consist of layers which are chemically bond to each other, without any delamination occurring.

In the context of the present disclosure, the expression "low surface energy substrates" is meant to refer to those substrates having a surface energy of less than 34 dynes per centimeter. Included among such materials are polypropylene, polyethylene (e.g., high density polyethylene or HDPE), and blends of polypropylene (e.g. PP/EPDM, TPO).

In the context of the present disclosure, the expression "medium surface energy substrates" is meant to refer to those substrates having a surface energy comprised between 34 and 70 dynes per centimeter, typically between 34 and 60 dynes per centimeter, and more typically between 34 and 50 dynes per centimeter. Included among such materials are polyamide 6 (PA6), acrylonitrile butadiene styrene (ABS), PC/ABS blends, PC, PVC, PA, PUR, TPE, POM, polystyrene, poly(methyl methacrylate) (PMMA), clear coat surfaces, in particular clear coats for vehicles like a car or coated surfaces for industrial applications and composite materials like fiber reinforced plastics.

In the context of the present disclosure, the expression "high surface energy substrates" is meant to refer to those substrates having a surface energy of more than 350 dynes per centimeter, typically more than 400 dynes per centimeter, and more typically to those substrates having a surface energy comprised between 400 and 1100 dynes per centimeter. Included among such materials are metal substrates (e.g. aluminium, stainless steel), and glass.

The surface energy is typically determined from contact angle measurements as described, for example, in ASTM D7490-08.

The multilayer PSA assembly according to the invention is particularly suitable to be bonded to low energy surfaces, such as polyolefin surfaces and clear coat surfaces. More particularly, the multilayer PSA assembly disclosed herein may be advantageously bonded to clear coat surfaces of vehicles, in particular of cars.

As used herein, the term "alkyl (meth)acrylate" and "alkyl (meth)acrylate ester" are used interchangeably. The term "(meth)acrylate" refers to an acrylate, methacrylate, or both. The term "(meth)acrylic" refers to methacrylic, acrylic, or both. A (meth)acrylic-based" material refers to one prepared from one or more monomers having a (meth)acryloyl group, which is a group of formula $CH_2=C(R)-(CO)-$ where R is hydrogen or methyl.

The term "alkyl" refers to a monovalent group which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and 2-ethylhexyl.

The terms "glass transition temperature" and "Tg" are used interchangeably and refer to the glass transition temperature of a material or a mixture. Unless otherwise indicated, glass transition temperature values are determined by Differential Scanning calorimetry (DSC).

(Meth)acrylic-based polymeric materials included in known pressure-sensitive adhesives are often prepared from one or more non-polar acrylate monomers with a relatively low glass transition temperature (Tg) (i.e., the Tg of a monomer is measured as a homopolymer prepared from the monomer) plus various optional monomers such as one or more polar monomers. The polar monomers are often selected to have an acidic group, a hydroxyl group, or a nitrogen-containing group.

Some widely used non-polar acrylate monomers in conventional (meth)acrylic-based elastomeric materials are alkyl (meth)acrylates such as 2-ethylhexyl acrylate (2-EHA) and isooctyl acrylate (IOA). Both of these alkyl acrylates have an alkyl group with eight carbon atoms (i.e., the monomers are $C_8$ alkyl acrylates). Alkyl (meth)acrylates having alkyl groups with more than eight carbon atoms or less than eight carbon atoms can have a number of disadvantages in terms of pressure-sensitive adhesive performance. For example, alkyl (meth)acrylates with shorter alkyl chains (e.g., butyl acrylate, which is a $C_4$ alkyl acrylate), tend to significantly increase both the Tg and storage modulus of the elastomeric material. The room temperature storage modulus can increase above the useful range for a pressure-sensitive adhesive (e.g., about $3 \times 10^6$ dynes/cm$^2$). That is, the resulting elastomeric material may have insufficient tackiness to be considered a pressure-sensitive adhesive. Alternatively, alkyl (meth)acrylates with longer alkyl chains such as longer linear alkyl chains (e.g., n-octadecyl acrylate, which is a $C_{18}$ alkyl acrylate), can lead to crystalline groups within the polymer. The presence of these crystalline groups can significantly reduce the tackiness of the elastomeric material.

If the crystallization temperature (Tc) can be suppressed, alkyl (meth)acrylates having alkyl groups with a greater number of carbon atoms can be beneficial over conventional $C_8$ alkyl (meth)acrylates. Pressure sensitive adhesive compositions are provided that are formed using an alkyl (meth) acrylate with an alkyl group that is branched and that contains 10 carbon atoms. These (meth)acrylic-based compositions can have a lower Tg, a lower plateau storage modulus, improved solubility (i.e., miscibility or compatibility) with hydrogenated tackifiers of low polarity, and improved adhesive strength (i.e., peel strength) on low surface energy substrates compared to elastomeric materials prepared using conventional $C_8$ alkyl (meth)acrylates.

According to the present disclosure, the pressure-sensitive adhesive layer for use in the multilayer PSA assembly comprises a pressure-sensitive adhesive composition comprising a reaction product of a polymerizable material comprising:

(a) 2-propylheptyl acrylate as a first monomer; and optionally
(b) a second monomer having an ethylenically unsaturated group.

2-propylheptyl acrylate monomer for use herein, as a first monomer of the polymerizable material, has the following chemical structure (I), and may be obtained from BASF, AG, Germany:

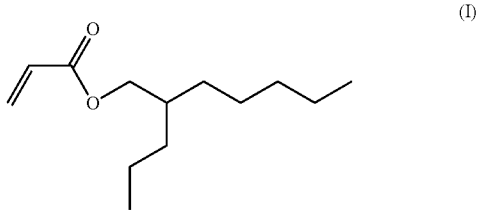

(I)

In some optional aspects, the polymerizable material used for producing the pressure-sensitive adhesive layer of the multilayer PSA assembly, may comprise a second monomer having an ethylenically unsaturated group.

In some exemplary aspects, the polymerizable material used for producing the pressure-sensitive adhesive layer of the multilayer PSA assembly comprises (at least one) second monomer having an ethylenically unsaturated group. Any suitable second monomer having an ethylenically unsaturated group may be used to prepare the polymerizable material used for producing the pressure-sensitive adhesive layer of the multilayer PSA assembly. Suitable second monomer having an ethylenically unsaturated group for use herein will be easily identified by those skilled in the art in the light of the present description.

Exemplary second monomers having an ethylenically unsaturated group for use herein include those selected from the group consisting of polar and non-polar alkyl (meth)acrylate esters which are different from 2-propylheptyl acrylate, polar monomers, non-polar vinyl monomers, and any combinations or mixtures thereof.

According to a typical aspect, the second monomer having an ethylenically unsaturated group comprises an alkyl (meth)acrylate ester, preferably having an alkyl group comprising from 1 to 30, from 1 to 20, or even from 1 to 15 carbon atoms.

In a more typical aspect, the polymerizable material further comprises a second non-polar monomer having an ethylenically unsaturated group. Any non-polar monomer with an ethylenically unsaturated group can be used in combination with 2-propylheptyl acrylate as the second monomer to prepare the polymerizable material used for producing the pressure-sensitive adhesive layer of the multilayer PSA assembly. Suitable non-polar monomers having an ethylenically unsaturated group for use herein will be easily identified by those skilled in the art in the light of the present description.

Suitable second non-polar monomers having an ethylenically unsaturated group include, but are not limited to, non-polar alkyl (meth)acrylate esters. In particular, the second monomer comprises a non-polar alkyl (meth)acrylate ester having an alkyl group comprising from 1 to 30, from 1 to 20, from 1 to 15, or even from 1 to 13 carbon atoms.

Particular non-polar alkyl (meth)acrylate esters with an alkyl group having from 1 to 30 carbon atoms for use herein include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, iso-pentyl (meth)acrylate (i.e., iso-amyl (meth)acrylate), 3-pentyl (meth)acrylate, 2-methyl-1-butyl (meth)acrylate, 3-methyl-1-butyl (meth)acrylate, stearyl (meth)acrylate, phenyl (meth)acrylate, n-hexyl (meth)acrylate, iso-hexyl (meth)acrylate, cyclohexyl (meth)acrylate, 2-methyl-1-pentyl (meth)acrylate, 3-methyl-1-pentyl (meth)acrylate, 4-methyl-2-pentyl (meth)acrylate, 2-ethyl-1-butyl (meth)acrylate, 2-methy-1-hexyl (meth)acrylate, 3,5,5-trimethyl-1-hexyl (meth)acrylate, cyclohexyl (meth)acrylate, 3-heptyl (meth)acrylate, benzyl (meth)acrylate, n-octyl (meth)acrylate, iso-octyl (meth)acrylate, 2-octyl (meth)acrylate, 2-ethyl-1-hexyl (meth)acrylate, n-decyl (meth)acrylate, iso-decyl (meth)acrylate, isobornyl (meth)acrylate, 2-propylheptyl (meth)acrylate, isononyl (meth)acrylate, isophoryl (meth)acrylate, n-dodecyl (meth)acrylate (i.e., lauryl (meth)acrylate), n-tridecyl (meth)acrylate, iso-tridecyl (meth)acrylate, 3,7-dimethyl-octyl (meth)acrylate, and any combinations or mixtures thereof.

Other suitable alkyl (meth)acrylate esters for use herein include those with an alkyl group having at least 14 carbon atoms but that are linear or that have a single branching point. Examples include, but are not limited to, 1-octadecyl (meth)acrylate, 17-methyl-1-heptadecyl (meth)acrylate, and 1-tetradecyl (meth)acrylate.

Still other suitable non-polar (meth)acrylate esters for use herein are aryl (meth)acrylates such as, for example, phenyl (meth)acrylate or benzyl (meth)acrylate; alkenyl (meth)acrylates such as, for example, 3,7-dimethyl-6-octenyl-1 (meth)acrylate and allyl (meth)acrylate; and aryl substituted alkyl (meth)acrylates or aryloxy substituted alkyl (meth)acrylates such as, for example, 2-biphenylhexyl (meth)acrylate, benzyl (meth)acrylate, and 2-phenoxy ethyl (meth)acrylate.

In some typical aspects, it might be advantageous for the second non-polar monomer for use in the multilayer PSA assembly to have a relatively high Tg when formed into a homopolymer (i.e., a polymer prepared using a single polymerizable material), as these monomers have the ability to modulate the Tg of the polymerizable material so as to provide enhanced adhesive strength. When formed into a homopolymer, these monomers typically have a glass transition temperature (Tg) of at least 20° C., or at least 25° C., or at least 30° C., or at least 40° C., or even at least 50° C. However, the disclosure is not that limited, as a second non-polar monomer for use in the multilayer PSA assembly may also have a relatively low Tg when formed into a homopolymer, i.e. a Tg of below 20° C.

According to a particular aspect, the second non-polar monomer is for example selected from the group consisting of methyl (meth)acrylate, tert-butyl (meth)acrylate, ethyl (meth)acrylate, n-propyl (meth)acrylate, isopropyl (meth)acrylate, iso-butyl (meth)acrylate, stearyl (meth)acrylate, phenyl (meth)acrylate, cyclohexyl (meth)acrylate, isobornyl (meth)acrylate, benzyl (meth)acrylate, isophoryl (meth)acrylate, and any combinations or mixtures thereof.

In a preferred aspect, the second non-polar monomer for use herein is selected from the group consisting of isobornyl (meth)acrylate, cyclohexyl (meth)acrylate, isophoryl (meth)acrylate, cyclohexyl (meth)acrylate, and any combinations or mixtures thereof. According to a particularly preferred aspect, the second monomer is selected to comprise isobornyl (meth)acrylate.

Further second monomers having an ethylenically unsaturated group for use herein may include a monomer with an acidic group and a single ethylenically unsaturated group (i.e., an acidic monomer). These monomers are typically polar or strongly polar. Polarity (i. e., hydrogen-bonding ability) is frequently described by the use of terms such as 'strongly', 'moderately', and 'poorly'. References describing these and other solubility terms include 'Solvents', Paint Testing Manual, 3rd ed., G. G. Seward, Ed., American Society for Testing and Materials, Philadelphia, Pa., and 'A Three-Dimensional Approach to Solubility', Journal of Paint Technology, Vol. 38, No. 496, pp. 269-280. The ethylenically unsaturated group can be a (meth)acryloyl group or a vinyl group (i.e., CH2=CH2- group) that is not a (meth) acryloyl group. Exemplary acidic monomers can have a carboxylic acid group, sulfonic acid group, phosphonic acid group, or salts thereof. Due to their availability, acidic monomers with carboxylic acid groups or salts thereof are often selected. If stronger acidic groups are desired, monomers with phosphonic acid, sulfonic acid groups, or salts thereof can be used. Examples of acidic monomers include, but are not limited to, (meth)acrylic acid, itaconic acid, fumaric acid, crotonic acid, citraconic acid, maleic acid, oleic acid, beta-carboxyethyl (meth)acrylate, 2-sulfoethyl methacrylate, styrene sulfonic acid, 2-acrylamido-2-methyl-propanesulfonic acid, vinylphosphonic acid, or mixtures thereof. Any suitable salt of an acidic group can be used. In many embodiments, the cation of the salt is an ion of an alkaline metal (e.g., sodium, potassium, or lithium ion), an ion of an alkaline earth (e.g., calcium, magnesium, or strontium ion), an ammonium ion, or an ammonium ion substituted with one or more alkyl or aryl groups.

For differentiation of polarity, some examples will be given. In particular useful representatives of strongly polar monomers are acrylic acid, methacrylic acid, itaconic acid, hydroxyalkyl acrylates, acrylamides and substituted acrylamides while, for example N-vinyl pyrrolidone, N-vinyl caprolactam, acrylonitrile, vinylchloride, diallyl phthalate and N,N-dialkylamino (meth)acrylates are typical examples of moderately polar monomers. Further examples for polar monomers include cyano acrylate, fumaric acid, crotonic acid, citronic acid, maleic acid, β-carboxyethyl acrylate or sulfoethyl methacrylate. The alkyl (meth)acrylate monomers enumerated above are typical examples of relatively poorly polar monomers. These examples are given for illustrative reasons only and are not to be understood as limiting. Among the group of polar monomers for use as the second monomer, N-vinyl caprolactam is particularly preferred.

For the multilayer PSA films according to the present disclosure, the content of strongly polar acrylates is typically limited in order to provide good adhesion to LSE (Low Surface Energy) surfaces. Hence, it is advantageous that the polymerizable material for the pressure sensitive adhesive layer(s) of the multilayer PSA assembly comprises up to 10 weight percent of the strongly polar acrylate based on a total weight of polymerizable material, or from 0.1 to 10 weight percent, from 0.5 to 10 weight percent, from 1.0 to 10 weight percent, from 2.0 to 8.0 weight percent, from 2.5 to 6.0 weight percent, or even from 3.0 to 6.0 weight percent, when the multilayer PSA assembly is in particular intended for adhesion to LSE substrates.

Other second monomers having an ethylenically unsaturated group suitable for use herein include those with a single ethylenically unsaturated group and a hydroxyl group. These monomers tend to be polar. The ethylenically unsaturated group can be a (meth)acryloyl group or a vinyl group (i.e., CH2=CH2- group). Exemplary monomers with a hydroxyl group include, but are not limited to, hydroxyalkyl (meth)acrylates (e.g., 2-hydroxyethyl acrylate or 3-hydroxypropyl acrylate), hydroxyalkyl (meth)acrylamides (e.g., 2-hydroxyethyl acrylamide or 3-hydroxypropyl acrylamide), and ethoxylated hydroxyethyl methacrylate (e.g., monomers commercially available from Sartomer under the trade designation CD570, CD571, CD572).

Still other suitable second monomers having an ethylenically unsaturated group are those with a single ethylenically unsaturated group and a nitrogen-containing group or a salt thereof. Most of these monomers tend to be polar. The ethylenically unsaturated group can be a (meth)acryloyl group or a vinyl group (i.e., CH2=CH2- group). Examples of the nitrogen-containing groups include, but at not limited to, secondary amido groups and tertiary amido groups. Exemplary polar monomers with secondary amido groups include, but are not limited to, N-alkyl (meth)acrylamides such as N-methyl acrylamide, N-ethyl acrylamide, N-isopropyl acrylamide, tert-octyl acrylamide, or N-octyl acrylamide. Exemplary polar monomers with a tertiary amido group include, but are not limited to, N-vinyl caprolactam, N-vinyl-2-pyrrolidone, acryloyl morpholine, and N,N-dialkyl acrylamides such as N,N-dimethyl acrylamide, N,N-diethyl acrylamide, N,N-dipropyl acrylamide, N,N-dibutyl acrylamide, and any combinations or mixtures thereof.

Still other suitable polar second monomers having an ethylenically unsaturated group for use herein include those with a single ethylenically unsaturated group and an ether group (i.e., a group containing at least one alkylene-oxy-alkylene group of formula —R—O—R— where each R is an alkylene having 1 to 4 carbon atoms). These monomers tend to be polar. Exemplary monomers include, but are not limited to, alkoxylated alkyl (meth)acrylates such as ethoxy-ethoxyethyl acrylate, 2-methoxyethyl acrylate, and 2-ethoxyethyl acrylate; and a poly(alkylene oxide) acrylates such as poly(ethylene oxide) acrylates, and poly(propylene oxide) acrylates. The poly(alkylene oxide) acrylates are often referred to as poly(alkylene glycol) acrylates. These monomers can have any suitable end group such as a hydroxyl group or an alkoxy group. For example, when the end group is a methoxy group, the monomer can be referred to as methoxy poly(ethylene glycol) acrylate.

The various polar monomers may typically be added to increase adhesion of the pressure-sensitive adhesive of the pressure sensitive adhesive layer(s) of the PSA assembly to an adjacent layer such as a substrate or a backing layer, to enhance the cohesive strength of the polymerizable material, or both. Any of the polar monomers or salt thereof can be present in any suitable amounts. In some exemplary aspects, the polar monomers are present in amounts up to 15 weight percent based on a total weight of the polymerizable material used to produce the pressure-sensitive adhesive layer of the multilayer PSA assembly. Accordingly, in some exemplary aspects, the polar monomer, preferably a polar acrylate monomer, can be present in an amount in a range of from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a first polar monomer. In some other exemplary aspects, this amount is typically up to 10 weight percent or up to 5 weight percent. For example, the polar monomer can be present in an amount in a range of 0 to 15 weight percent, 0.5 to 15 weight percent, 1 to 15 weight percent, 0 to 10 weight percent, 0.5 to 10 weight percent, 1 to 10 weight percent, 0 to 5 weight percent, 0.5 to 5 weight percent, or 1 to 5 weight percent based on a total weight of the polymerizable material used to produce the pressure-sensitive adhesive layer of the multilayer PSA assembly.

In some aspects, the second monomer having an ethylenically unsaturated group for use herein is for example selected from the group consisting of methyl methacrylate, tert-butyl (meth)acrylate, ethyl (meth)acrylate, n-propyl (meth)acrylate, isopropyl (meth)acrylate, iso-butyl (meth) acrylate, stearyl (meth)acrylate, phenyl (meth)acrylate, cyclohexyl (meth)acrylate, isobornyl (meth)acrylate, benzyl (meth)acrylate, isophoryl (meth)acrylate, N-vinyl caprolactam, and any combinations or mixtures thereof.

More typically, the second monomer having an ethylenically unsaturated group for use herein is for example selected from the group consisting of isobornyl (meth) acrylate, cyclohexyl (meth)acrylate, isophoryl (meth)acrylate, cyclohexyl (meth)acrylate, N-vinyl caprolactam, and any combinations or mixtures thereof. Even more typically, the second monomer is selected from the group of isobornyl (meth)acrylate and N-vinyl caprolactam.

In one particularly preferred aspect, the second monomer having an ethylenically unsaturated group for use herein is selected to be isobornyl (meth)acrylate, preferably isobornyl acrylate.

In some exemplary aspects, the polymerizable material used for producing the pressure-sensitive adhesive layer of the multilayer PSA assembly, may comprise (at least one) further co-monomer. Any further co-monomer can be used to prepare the polymerizable material used for producing the pressure-sensitive adhesive layer of the multilayer PSA assembly. Suitable further co-monomer for use herein will be easily identified by those skilled in the art, in the light of the present description.

Exemplary further co-monomers for use herein include those described above with respect to the second monomer having an ethylenically unsaturated group. In a typical aspect, further co-monomers for use herein include those selected from the group consisting of non-polar alkyl (meth) acrylate esters, polar monomers, non-polar vinyl monomers, and any combinations or mixtures thereof. In another typical aspect, further co-monomers for use herein include those selected from the group consisting of non-polar alkyl (meth) acrylate esters, as described hereinabove.

In an advantageous aspect of the multilayer PSA assembly, the polymerizable material comprises a further co-monomer selected from the group of polar monomers, which preferably comprise an acidic group, a hydroxyl group, or a nitrogen-containing group, and wherein the acidic group is preferably a carboxyl group or a salt thereof.

In still another advantageous aspect, the further co-monomer comprises a polar monomer, preferably a polar acrylate, more preferably selected from the group consisting of acrylic acid, methacrylic acid, itaconic acid, hydroxyalkyl acrylates, acrylamides and substituted acrylamides, acrylamines and substituted acrylamines, and any combinations or mixtures thereof. In a particularly advantageous aspect, the further co-monomer comprises acrylic acid.

In some aspects of the multilayer PSA assembly, the polymerizable material used to produce the pressure sensitive adhesive layer comprises from 50 to 99.5 weight percent, or from 60 to 90 weight percent of 2-propylheptyl acrylate as a first monomer and from 0.5 to 50 weight percent, from 1.0 to 50 weight percent, from 3.0 to 40 weight percent, from 5.0 to 35 weight percent, or even from 10 to 30 weight percent, of the second monomer having an ethylenically unsaturated group, based on the total weight of polymerizable material.

In some other aspects of the multilayer PSA assembly, the polymerizable material comprises at least 50 weight percent of 2-propylheptyl acrylate as a first monomer and up to 15 weight percent, or up to 10 weight percent of a polar monomer, preferably a polar acrylate, based on the total weight of polymerizable material.

In some other aspects of the multilayer PSA assembly, the polymerizable material comprises at least 0.1 weight percent, at least 0.5 weight percent, at least 1 weight percent, or at least 2 weight percent, or even at least 3 weight percent, of a polar monomer, preferably a polar acrylate, based on the total weight of polymerizable material.

According to an advantageous aspect of the multilayer PSA assembly, the polymerizable material comprises:
a) from 50 to 99.5 weight percent, or from 60 to 90 weight percent, of 2-propylheptyl acrylate as a first monomer;
b) from 1.0 to 50 weight percent, from 3.0 to 40 weight percent, from 5.0 to 35 weight percent, or even from 10 to 30 weight percent, of the second monomer having an ethylenically unsaturated group, preferably a second non-polar monomer having an ethylenically unsaturated group;
c) from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a polar monomer, preferably a polar acrylate; and optionally
d) a tackifying resin,
    wherein the weight percentages are based on the total weight of polymerizable material.

According to still another advantageous aspect of the multilayer PSA assembly, the polymerizable material comprises:
a) from 50 to 99.5 weight percent, or from 60 to 90 weight percent, of 2-propylheptyl acrylate as a first monomer;
b) from 1.0 to 50 weight percent, from 3.0 to 40 weight percent, from 5.0 to 35 weight percent, or even from 10 to 30 weight percent, of the second monomer having an ethylenically unsaturated group, preferably a second non-polar monomer having an ethylenically unsaturated group;
c) from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a first polar monomer, preferably a polar acrylate; optionally
d) a second polar monomer, preferably a polar non-acrylate monomer; and optionally
e) a tackifying resin;
    wherein the weight percentages are based on the total weight of polymerizable material.

According to still another advantageous aspect of the multilayer PSA assembly, the pressure-sensitive adhesive composition further comprises a tackifying resin, typically in an amount from 3 to 50 parts, from 5 to 30 parts, or even from 8 to 25 parts, per 100 parts of the polymerizable material.

In some executions, one or more tackifiers, one or more plasticizers, or a mixture thereof can be combined with the polymerizable material. Tackifiers (i.e., tackifying agents or tackifying resins) and plasticizers (i.e., plasticizing agents) are often added to modulate the Tg, modulate the storage modulus, and to alter the tackiness of the pressure-sensitive adhesive.

Any tackifiers that are included in the pressure-sensitive adhesive compositions are typically selected to be miscible with the polymerizable material. Any tackifier typically included in conventional pressure-sensitive adhesive compositions may be used. Either solid or liquid tackifiers can be added. Solid tackifiers generally have a number average molecular weight (Mw) of 10,000 grams per mole or less and a softening point above about 70° C. Liquid tackifiers are viscous materials that have a softening point of about 0° C. to about 70° C.

Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used if desired.

Tackifiers that are rosin esters are the reaction products of various rosin acids and alcohols. These include, but are not limited to, methyl esters of rosin acids, triethylene glycol esters of rosin acids, glycerol esters of rosin acids, and pentaertythritol esters of rosin acids. These rosin esters can be hydrogenated partially or fully to improve stability and reduce their color contribution to the pressure-sensitive adhesive composition. The rosin resin tackifiers are commercially available, for example, from Eastman Chemical Company under the trade designations PERMALYN, STAYBELITE, and FORAL as well as from Newport Industries under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E.

Tackifiers that are hydrocarbon resins can be prepared from various petroleum-based feed stocks. There feedstocks can be aliphatic hydrocarbons (mainly C5 monomers with some other monomers present such as a mixture of trans-1,3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color, their thermal stability or their process compatibility.

The C5-based hydrocarbon resins are commercially available from Eastman Chemical Company under the trade designations PICCOTAC and EASTOTAC, from Cray Valley under the trade designation WINGTACK, from Neville Chemical Company under the trade designation NEVTAC LX, and from Kolon Industries, Inc. under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, and PICCOTAC, and ENDEX, from Cray Valley under the trade designations NORSOLENE, from Ruetgers N.V. under the trade designation NOVAREZ, and from Kolon Industries, Inc. under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREZ that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa under the trade designation ARKON, from Zeon under the trade designation QUINTONE, from Exxon Mobile Chemical under the trade designation ESCOREZ, and from Newport Industries under the trade designations NURES and H-REZ (Newport Industries).

The high solubility parameter of most conventional (meth)acrylic-based elastomeric materials and the presence of specific potential interactions between these elastomeric materials and many tackifiers has limited the tackifiers that are suitable for use in many conventional pressure-sensitive adhesive compositions. As a class, the C5-based hydrocarbon resins and C9-based hydrocarbon resins, and especially hydrogenated versions of these hydrocarbon resins, have been considered unsuitable for use with most conventional (meth)acrylic-based elastomeric materials. Without wishing to be bound by theory, it is believed there is a solubility mismatch between the relatively polar conventional (meth)acrylic-based elastomeric materials and the non-polar hydrogenated hydrocarbon resin tackifiers.

In contrast to conventional (meth)acrylic-based elastomeric material, the polymerizable material prepared using 2-propylheptyl acrylate as a monomer have greater compatibility with petroleum-based resins such as the C5-based hydrocarbon resins, the C9-based hydrocarbon resin, the C5/C9-based hydrocarbon resins, and hydrogenated versions of any of these resins. The resulting pressure-sensitive adhesive can appear clear and can remain clear even after aging at temperatures such as 70° C. for 1 week.

Based on solubility considerations, the rosin ester tackifiers and selected terpene resins such as phenol-modified terpene and alpha-pinene based resins have performed well in pressure-sensitive adhesive compositions containing conventional (meth)acrylic-based elastomeric materials. However, some problems are still associated with the use of these tackifiers. For example, pressure-sensitive adhesive compositions containing these tackifiers are often discolored or yellow. The yellow appearance is a direct result of the distinct yellow tinge inherent in many of these tackifiers. Upon aging (e.g., at 70° C. for 1 week) and exposure to light, this discoloration can become even more pronounced, even with lighter colored grades of resin. (Meth)acrylic-based pressure-sensitive adhesives without tackifiers typically have excellent aging properties. The yellow appearance can often be minimized by hydrogenation of the tackifiers but the resulting hydrogenated resins are often not as compatible with conventional (meth)acrylic-based elastomers as their non-hydrogenated equivalents.

Tackified pressure-sensitive adhesives containing conventional (meth)acrylic-based elastomeric materials can also appear cloudy, demonstrating a loss in the characteristic transparency of the conventional (meth)acrylic-based elastomeric materials. The cloudiness is an indication of limited or incomplete compatibility of the tackifier and the elastomeric material. The reduced compatibility can lead to a degradation of adhesive properties, as evidenced by a loss of tack or reduced peel adhesion on aging. In some cases, the addition of a tackifier to a pressure-sensitive adhesive composition having acrylic monomers, polymers, oligomers, and any mixture thereof, can be clear and appear to be compatible. However, after removing the solvent, curing, or aging, the pressure-sensitive adhesive can become cloudy, which indicates at least some incompatibility between the tackifier and the conventional (meth)acrylic-based elastomeric material.

In addition to these losses in clarity and stability of tackified pressure-sensitive adhesive compositions, other deleterious effects can be observed when tackifiers are present during the polymerization reaction used to form the conventional (meth)acrylic-based elastomeric materials. Depending on the structure of the tackifier, undesirable effects of adding a tackifier include the inhibition or retardation of the polymerization reaction and/or the alteration of the final polymer structure if the tackifier acts as a chain-transfer or chain-terminating agent. Such effects can adversely influence the performance and stability of elastomeric materials prepared in the presence of these tackifiers. Chain termination can also result in undesirably high residual volatile materials. These effects can be minimized or eliminated through the use of hydrogenated tackifiers that do not have ethylenically unsaturated groups.

The polymerizable materials formed using 2-propylheptyl acrylate as a monomer are typically compatible with (i.e., miscible with) hydrogenated tackifiers. The hydrogenated tackifiers can be at least partially hydrogenated to remove any double bonds that are not part of a ring structure. That is, the tackifiers can be hydrogenated such that they are at least free of ethylenically unsaturated bonds. In some aspects, the hydrogenated tackifiers have ring structures that are unsaturated. These tackifiers are only partially hydrogenated and may contain, for example, aromatic rings. In other aspects, any double bonds that are not part of a ring structure plus at least some of the double bonds in ring structures are hydrogenated. In still other embodiments, the tackifiers are fully hydrogenated including any ring structures. The hydrogenated tackifiers can be, for example, hydrogenated terpene resins, hydrogenated rosin resins, hydrogenated C5-based hydrocarbon resins, hydrogenated C9-based hydrocarbon resins, or combinations thereof.

The use of the polymerizable materials formed using 2-propylheptyl acrylate as a monomer are more compatible with hydrogenated tackifiers and, in particular, are more compatible with fully hydrogenated tackifiers. Compared to conventional (meth)acrylic-based elastomeric materials prepared from $C_8$ alkyl acrylates, these pressure-sensitive adhesive often have a higher clarity after curing and/or after aging at 70° C. for 1 week. The higher clarity tends to indicate improved compatibility between the pressure sensitive adhesive composition and the tackifier. This improved compatibility is often reflected in improved adhesive strength (e.g., as measured using 90 degree peel strength) and improved shear holding force.

Any of the tackifiers may be used in amounts of up to 100 parts relative to 100 parts of the polymerizable material. It is however preferred to use lower amounts of tackifiers. For example, the tackifiers can be used in amounts up to 50 parts, up to 45 parts, up to 40 parts, up to 35 parts, or up to 30 parts. The amount of tackifier can be for example, in the range of 3 to 50 parts, in the range of 3.5 to 45 parts, in the range of 4 to 40 parts, in the range of 4.5 to 35 parts, or in the range of 5 to 30 parts based on 100 parts of the polymerizable material. In some other aspects, the tackifier may be used in an amount from 3 to 100 parts, or from 3 to 80 parts based on 100 parts of the polymerizable material.

In an advantageous aspect of the multilayer PSA, the tackifying resin is selected from the group consisting of C5-based hydrocarbon resins, C9-based hydrocarbon resins, C5/C9-based hydrocarbon resins, and any combinations or mixtures thereof. In another advantageous aspect, the tackifying resin is selected from the group consisting of hydrogenated terpene resins, hydrogenated rosin resins, hydrogenated C5-based hydrocarbon resins, hydrogenated C9-based hydrocarbon resins, hydrogenated C5/C9-based hydrocarbon resins, and any combinations or mixtures thereof.

Some pressure-sensitive adhesive compositions useful for the multilayer PSA film according to this disclosure may include one or more plasticizers. The plasticizer is typically selected to be compatible with (i.e., miscible with) the other components in the composition such as the polymerizable material and any optional tackifier. Suitable plasticizers include, but are not limited to, various polyalkylene oxides (e.g., polyethylene oxides or propylene oxides), adipic acid esters, formic acid esters, phosphoric acid esters, benzoic acid esters, phthalic acid esters, and sulfonamides, or naphthenic oils.

According to one particular aspect of the multilayer PSA assembly according to the present disclosure, the polymerizable material may further comprise a crosslinker (also referred to as crosslinking agent), preferably in an amount of up to 5 weight percent, based on the total weight of polymerizable material.

A crosslinker can also be used, in the context of the present disclosure, as a second monomer having an ethylenically unsaturated group. The crosslinker often increases the cohesive strength and the tensile strength of the polymerizable material. The crosslinker can have at least two functional groups which are capable of polymerizing with the first monomer or another monomer. That is, the crosslinker can have at least two ethylenically unsaturated groups. Suitable crosslinkers often have multiple (meth) acryloyl groups. Alternatively, the crosslinker can have at least two groups that are capable of reacting with various functional groups (i.e., functional groups that are not ethylenically unsaturated groups) on another monomer. For example, the crosslinker can have multiple groups that can react with functional groups such as acidic groups on other monomers.

Crosslinkers with multiple (meth)acryloyl groups can be di(meth)acrylates, tri(meth)acrylates, tetra(meth)acrylates, penta(meth)acrylates, and the like. These crosslinkers can be formed, for example, by reacting (meth)acrylic acid with a polyhydric alcohol (i.e., an alcohol having at least two hydroxyl groups). The polyhydric alcohol often has two, three, four, or five hydroxyl groups. Mixtures of crosslinkers may also be used.

In many aspects, the crosslinkers contain at least two (meth)acryloyl groups. Exemplary crosslinkers with two acryloyl groups include, but are not limited to, 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary crosslinkers with three or four (meth)acryloyl groups include, but are not limited to, trimethylolpropane triacrylate (e.g., commercially available under the trade designation TMPTA-N from Cytec Industries, Inc., Smyrna, Ga. and under the trade designation SR-351 from Sartomer, Exton, Pa.), pentaerythritol triacrylate (e.g., commercially available under the trade designation SR-444 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth)acryloyl groups includes, but is not limited to, dipentaerythritol pentaacrylate (e.g., commercially available under the trade designation SR-399 from Sartomer).

In some aspects, the crosslinkers are polymeric material that contains at least two (meth)acryloyl groups. For example, the crosslinkers can be poly(alkylene oxides) with at least two acryloyl groups (e.g., polyethylene glycol diacrylates commercially available from Sartomer such as SR210, SR252, and SR603) or poly(urethanes) with at least two (meth)acryloyl groups (e.g., polyurethane diacrylates such as CN9018 from Sartomer). As the higher molecular weight of the crosslinkers increases, the resulting acrylic copolymer tends to have a higher elongation before breaking. Polymeric crosslinkers tend to be used in greater weight percent amounts compared to their non-polymeric counterparts.

Other types of crosslinkers can be used rather than those having at least two (meth)acryloyl groups. The crosslinker can have multiple groups that react with functional groups such as acidic groups on other second monomers. For example, monomers with multiple aziridinyl groups can be used that are reactive with carboxyl groups. For example, the crosslinkers can be a bis-amide crosslinker as described in U.S. Pat. No. 6,777,079 (Zhou et al.).

In other methods of crosslinking, photocrosslinkers (e.g., UV photocrosslinkers) are added. These photocrosslinkers can be copolymerizable with the various monomers used to form the elastomeric material (e.g., copolymerizable benzophenones) or can be added after polymerization. Suitable photocrosslinkers added after polymerization include, for example, multifunctional benzophenones, triazines (such as XL-330, which is 2,4,-bis(trichloromethyl)-6-(4-methoxyphenyl)-triazine from 3M Company, Saint Paul, Minn.), acetophenones, and the like.

In still other methods of crosslinking, thermal crosslinkers may be used, optionally in combination with suitable accelerants and retardants. Suitable thermal crosslinkers for use herein include, but are not limited to, isocyanates, more particularly trimerized isocyanates and/or sterically hindered isocyanates that are free of blocking agents, or else epoxide compounds such as epoxide-amine crosslinker systems. Advantageous crosslinker systems and methods are described e.g. in the descriptions of DE202009013255 U1, EP 2 305 389 A, EP 2 414 143 A, EP 2 192 148 A, EP 2 186 869, EP 0 752 435 A, EP 1 802 722 A, EP 1 791 921 A, EP 1 791 922 A, EP 1 978 069 A, and DE 10 2008 059 050 A, the relevant contents of which are herewith incorporated by reference. Suitable accelerant and retardant systems for use herein are described e.g. in the description of US-A1-2011/0281964, the relevant content of which is herewith explicitly incorporated by reference. Suitable thermal crosslinkers for use herein include epoxycyclohexyl derivatives, in particular epoxycyclohexyl carboxylate derivatives, with particular preference to (3,4-epoxycyclohexane)methyl 3,4-epoxycyclohexylcarboxylate, commercially available from Cytec Industries Inc. under tradename UVACURE 1500.

If present, a crosslinker can be used in any suitable amount. In many aspects, the crosslinker is present in an amount of up 5 parts by weight based on a total weight of polymerizable material. In some aspects, the crosslinker is present in an amount up to 4 weight percent, up to 3 weight percent, up to 2 weight percent, or up to 1 weight percent. The crosslinker can be present, for example, in amounts greater than 0.01 weight percent, greater than 0.03 weight percent, greater than 0.05 weight percent, greater than 0.07 weight percent, or greater than 1 weight percent. In some aspects, the crosslinker is present in an amount in a range of 0 to 5 weight percent, 0.01 to 5 weight percent, 0.05 to 5 weight percent, 0 to 3 weight percent, 0.01 to 3 weight percent, 0.05 to 3 weight percent, 0 to 1 weight percent, 0.01 to 1 weight percent, or 0.05 to 1 weight percent. As another example, any of the polymerizable materials can include up to 5 weight percent crosslinker such as 0.01 to 5 weight percent, 0.05 to 5 weight percent, 0.07 to 5 weight percent, or 1 to 5 weight percent.

Aside from thermal, moisture or photosensitive crosslinking agents, crosslinking may also be achieved using high energy electromagnetic radiation such as gamma or e-beam radiation.

An initiator for free radical polymerization is typically added to the various monomers used to form the polymerizable material. The polymerization initiator can be a thermal initiator, a photoinitiator, or both. Any suitable thermal initiator or photoinitiator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of polymerizable material.

In some executions, a thermal initiator is used. Thermal initiators can be water-soluble or water-insoluble (i.e., oil-soluble) depending on the particular polymerization method used. Suitable water-soluble initiators include, but are not limited to, persulfates such as potassium persulfate, ammonium persulfate, sodium persulfate, and mixtures thereof; an oxidation-reduction initiator such as the reaction product of a persulfate and a reducing agent such as a metabisulfite (e.g., sodium metabisulfite) or a bisulfate (e.g., sodium bisulfate); or 4,4'-azobis(4-cyanopentanoic acid) and its soluble salts (e.g., sodium, potassium). Suitable oil-soluble initiators include, but are not limited to, various azo compounds such as those commercially available under the trade designation VAZO from E. I. DuPont de Nemours Co. including VAZO 67, which is 2,2'-azobis(2-methylbutane nitrile), VAZO 64, which is 2,2'-azobis(isobutyronitrile), and VAZO 52, which is (2,2'-azobis(2,4-dimethylpentanenitrile); and various peroxides such as benzoyl peroxide, cyclohexane peroxide, lauroyl peroxide, and mixtures thereof.

In many executions, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J.) or under the trade designation ESACURE KB-1 from Sartomer (Exton, Pa.)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxy cyclohexyl phenyl ketone (IRGACURE 184), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

The polymerizable material may optionally further contain chain transfer agents to control the molecular weight of the resultant elastomeric material. Examples of useful chain transfer agents include, but are not limited to, carbon tetrabromide, alcohols, mercaptans such as isooctylthioglycolate, and mixtures thereof. If used, the polymerizable mixture may include up to 0.5 weight of a chain transfer agent based on a total weight of polymerizable material. For example, the polymerizable mixture can contain 0.01 to 0.5 weight percent, 0.05 to 0.5 weight percent, or 0.05 to 0.2 weight percent chain transfer agent.

According to one particular aspect of the multilayer PSA assembly according to the present disclosure, the polymerizable material may further include one or more other vinyl monomers such as vinyl esters (e.g., vinyl acetate and vinyl propionate); styrene or derivatives thereof such as alkyl substituted styrene (e.g., α-methyl styrene); vinyl halide; or mixtures thereof. These monomers can be polar or nonpolar. If present, these other vinyl monomer can be present in any suitable amount. In some aspects, the vinyl monomers are present in an amount of up 5 parts by weight, based on a total weight of polymerizable material. For example, the vinyl monomer can be used in amounts up to 4 weight percent, up to 3 weight percent, or up to 2 weight percent. In some particular aspects, the vinyl monomer is present in an amount in a range of 0 to 5 weight percent, 0.5 to 5 weight percent, 1 to 5 weight percent, 0 to 3 weight percent, or 1 to 3 weight percent.

The polymerizable material used to form the pressure sensitive adhesive layer(s) of the multilayer PSA assembly may include an organic solvent or may be free or essentially free of an organic solvent. As used herein, the term "essentially free" in reference to an organic solvent means that the means that the organic solvent is present in an amount less than 5 weight percent, less than 4 weight percent, less than 3 weight percent, less than 2 weight percent, or less than 1 weight percent based on the weight of the polymerizable material. If an organic solvent is included in the polymerizable material, the amount is often selected to provide the desired viscosity. Examples of suitable organic solvents include, but are not limited to, methanol, tetrahydrofuran, ethanol, isopropanol, heptane, acetone, methyl ethyl ketone, methyl acetate, ethyl acetate, toluene, xylene, ethylene glycol alkyl ether, and any combinations or mixtures thereof.

The pressure-sensitive adhesive composition may be prepared by a variety of conventional free radical polymerization methods, including solution, bulk (i.e., with little or no solvent), dispersion, emulsion, and suspension processes. The particular method used may be influenced by the use of the final pressure-sensitive adhesive composition. The reaction product of the polymerizable materials can be random or block copolymers.

In some methods of preparing the pressure-sensitive adhesive compositions for the pressure sensitive adhesive layer(s) of the multilayer PSA film according to the disclosure, the polymerizable material containing the monomers is partially polymerized so as to increase its viscosity to that corresponding to a syrup-like material. Generally, the 2-propylheptyl acrylate monomers and other optional monomers are mixed with a portion of the free radical polymerization initiator. Depending on the type of initiator added, the mixture is typically exposed to actinic radiation or heat to partially polymerize the monovalent monomers (i.e., monomers with a single ethylenically unsaturated group). Then, the crosslinker and any remaining portion of the initiator may be added to the syrup-like, partially polymerized material. Optional tackifiers and plasticizers may also be combined with the partially polymerized material. The resulting mixture can be more readily applied as a coating composition onto a support (e.g., release liner) or another layer (e.g., polymeric foam layer). The coating layer can then be exposed to actinic radiation if a photoinitiator is present or to heat if a thermal initiator is present. Exposure to actinic radiation or heat typically results in the further reaction of polymerizable material within the coating composition.

To be useful as a pressure-sensitive adhesive, the pressure-sensitive adhesive material typically has a storage modulus less than 300,000 Pascals at 25° C. The storage modulus of the pressure-sensitive adhesive material usually is no greater than 200,000 Pascals, no greater than 100,000 Pascals, no greater than 50,000 Pascals, or no greater than 25,000 Pascal at 25° C. For example, the storage modulus can be no greater than 10,000 Pascals, no greater than 9,000 Pascals, no greater than greater than 8,000 Pascals, or no greater than 7,500 Pascals at 25° C. A lower storage modulus is often desirable for high performance pressure-sensitive adhesives.

The multilayer PSA assembly according to the present disclosure comprises a polymeric foam layer. Suitable polymeric foam layers for use herein will be easily identified by those skilled in the art, in the light of the present description. In the context of the present invention, the term "polymeric foam" is meant to designate a material based on a polymer and which material comprises voids, typically in an amount of at least 5% by volume, typically from 10% to 55% by volume or from 10% to 45% by volume. The voids may be obtained by any of the known methods such as cells formed by gas. Alternatively, the voids may result from the incorporation of hollow fillers, such as hollow polymeric particles, hollow glass or hollow ceramic microspheres.

In a typical aspect, the polymeric foam layer for use herein, comprises a polymer base material selected from the group consisting of polyacrylates, polyurethanes, polyolefins, polystyrenes, polyvinyls, natural rubbers, synthetic rubbers, polyvinylpyrrolidone, and any combinations, copolymers or mixtures thereof. More typically, the polymeric foam layer comprises a polymer base material selected from the group consisting of polyacrylates, polyurethanes, and any combinations, copolymers or mixtures thereof. Even more typically, the polymeric foam layer comprises a polymer base material selected from the group consisting of polyacrylates, and any combinations, copolymers or mixtures thereof.

In a typical aspect, the polymeric foam layer for use herein, is based on a polymer of an alkyl ester of acrylic or methacrylic acid (hereinafter referred to as "acrylic polymer"). The corresponding polymeric foam layer may also be referred to as "acrylic foam". Typically, the acrylic polymer is a polymer of 50 to 100 parts by weight of substituted or unsubstituted alkyl acrylate or alkyl methacrylate monomers whose homopolymers exhibit a glass transition temperature of 0° C. or less (collectively referred to hereinafter as "acrylate monomer") and 0 to 50 parts by weight of copolymerizable reinforcing monoethylenically unsaturated monomer, whose homopolymer preferably exhibits a glass transition temperature of 10° C. or greater.

Examples of this type of polymer are disclosed in U.S. Pat. No. Re. 24,906 (Ulrich) and include copolymers of 88-99 parts by weight of alkyl acrylate having an average of 4-12 carbon atoms (herein referred to as "C4-12") in the alkyl groups and 12 to 1 parts by weight of at least one of acrylic acid, methacrylic acid, itaconic acid, acrylamide and methacrylamide. Other useful reinforcing monoethylenically-unsaturated monomers which are copolymerizable with acrylate monomer include N-substituted acrylamides, acrylonitrile, methacrylonitrile, hydroxyalkyl acrylates, cyanoethyl acrylate, maleic anhydride, and N-vinyl-2-pyrrolidone, all of which result in pressure-sensitive adhesives which are tacky at ordinary room temperature when used with C4-12 alkyl acrylate in amounts up to about 12 mol percent of the acrylate monomer, or up to about 50 mol percent when the copolymerizable monomer is mainly N-vinylpyrrolidone. Other copolymerizable monomers that can be useful include alkyl vinyl ethers, vinylidene chloride, styrene, and vinyltoluene.

The polymeric foam layer for use herein need not be tacky, as the latter is generally laminated to or coated with the pressure-sensitive adhesive layer to provide the multilayer pressure sensitive adhesive assembly. Alternatively, the pressure-sensitive adhesive layer may be co-extruded with the polymeric foam layer, or subsequently extruded on the polymeric foam layer surface. The (thin) pressure sensitive adhesive layer may be provided on one major side of the polymeric foam layer but is preferably provided on both major sides of the polymeric foam layer.

The polymeric foam layer for use herein has for example a thickness comprised between 100 and 6000 µm, between 200 and 4000 µm, between 500 and 2000 µm, or even between 800 and 1500 µm. As will be apparent to those skilled in the art, in the light of the present description, the preferred thickness of the polymeric foam layer will be dependent on the intended application.

The polymeric foam layer typically has a density comprised between 0.45 g/cm$^3$ and 1.0 g/cm$^3$, between 0.45 g/cm$^3$ and 0.95 g/cm$^3$, between 0.50 g/cm$^3$ and 0.95 g/cm$^3$, between 0.60 g/cm$^3$ and 0.95 g/cm$^3$, or even between 0.70 g/cm$^3$ and 0.95 g/cm$^3$. This density is achieved by including voids or cells. Typically, the polymeric foam layer will comprise at least 5% of voids by volume and for example between 15 and 45%, or between 20% and 45% by volume.

The voids or cells in the acrylic foam can be created in any of the known manners described in the art and include the use of a gas or blowing agent and/or including hollow particles into the composition for the polymeric foam layer. For example, according to one method to create a polymeric foam described in U.S. Pat. No. 4,415,615, the acrylic foam can be obtained by the steps of (i) frothing a composition containing the acrylate monomers and optional comonomers, (ii) coating the froth on a backing and (iii) polymerizing the frothed composition. It is also possible to coat the unfrothed composition of the acrylate monomers and optional comonomers to the backing and to then simultaneously foam and polymerize that composition. Frothing of the composition may be accomplished by whipping a gas into the polymerizable composition. Preferred gasses for this purpose are inert gasses such as nitrogen and carbon dioxide, particularly if the polymerization is photoinitiated.

If the viscosity of a mixture of polymerizable monomers is too low to provide a coatable froth, the monomers may be partially polymerized prior to frothing to provide a composition having a viscosity in the range of about 1000 to 40,000 cps, conveniently by mixing a photoactive polymerization initiator with the monomers and exposing the mixture to ultraviolet radiation. Viscosities above 5000 cps tend to provide better cell uniformity, whereas viscosities below 15,000 cps are preferred for ease of handling. Instead of employing ultraviolet radiation, a heat-activatable polymerization initiator may be mixed with the monomers to provide a mixture which can be partially polymerized by heat to the desired viscosity prior to frothing. A third technique which has been successful is to mix the monomers with a thixotropic agent such as fumed silica, carrying out the entire polymerization in a single in situ step after coating.

If the monomer mixture has been photopolymerized to provide a froth of coatable viscosity, it may contain sufficient residual initiator to allow the coated froth to be fully polymerized under ultraviolet radiation. However, it is usually desirable to add further photoinitiator which may also be capable of crosslinking the polymer. If the monomers are partially polymerized thermally and the polymerization is to be completed in situ by heat, it is usually necessary to add additional heat-activatable polymerization initiator to the partially polymerized composition.

To increase the cohesive strength of the polymeric foam, the polymerizable composition typically includes a crosslinking agent. Useful crosslinking agents, which may also function as photopolymerization initiators; are e.g. disclosed hereinabove for inclusion in the polymerization material used for producing the pressure sensitive adhesive layer of the multilayer PSA assembly. Exemplary crosslinking agents are disclosed e.g. in U.S. Pat. No. 4,330,590 (Vesley) and U.S. Pat. No. 4,329,384 (Vesley, Moon). Other suitable crosslinking agents include polyacrylic functional monomers such a trimethylolpropane triacrylate and 1,2-ethylene glycol diacrylate.

In still other methods of crosslinking, thermal crosslinkers may be used, optionally in combination with suitable accelerants and retardants. Suitable thermal crosslinkers for use herein include, but are not limited to, isocyanates, more particularly trimerized isocyanates and/or sterically hindered isocyanates that are free of blocking agents, or else epoxide compounds such as epoxide-amine crosslinker systems. Advantageous crosslinker systems and methods are described e.g. in the descriptions of DE202009013255 U1, EP 2 305 389 A, EP 2 414 143 A, EP 2 192 148 A, EP 2 186 869, EP 0 752 435 A, EP 1 802 722 A, EP 1 791 921 A, EP 1 791 922 A, EP 1 978 069 A, and DE 10 2008 059 050 A, the relevant contents of which are herewith incorporated by reference. Suitable accelerant and retardant systems for use herein are described e.g. in the description of US-A1-2011/ 0281964, the relevant content of which is herewith explicitly incorporated by reference. Suitable thermal crosslinkers for use herein include epoxycyclohexyl derivatives, in particular epoxycyclohexyl carboxylate derivatives, with particular preference to (3,4-epoxycyclohexane)methyl 3,4-epoxycyclohexylcarboxylate, commercially available from Cytec Industries Inc. under tradename UVACURE 1500.

Aside from thermal, moisture or photosensitive crosslinking agents, crosslinking may achieve using high energy electromagnetic radiation such as gamma or e-beam radiation.

Alternatively, an acrylic foam may be obtained by including hollow particles i.e., hollow microspheres into a polymerizable composition for making the polymeric foam. Examples of hollow microspheres include expanded or expandable thermoplastic polymer microspheres and glass microbubbles. Examples of expanded or expandable thermoplastic polymer microspheres are disclosed in U.S. Pat. No. 4,855,170 and include the commercially available hollow polymeric microspheres from Pierce & Stevens Company under the tradename MICROLITE™ and MIRALITE™. Further commercially available expanded or expandable polymeric microspheres include EXPANCEL™ (Kema Nord Plastics) and MICROPEARL™ (Matsomoto Yushi Seiyaku). The hollow thermoplastic polymer microspheres typically have an average diameter of 5 to 150 microns or of 10 to 100 microns.

Suitable glass microspheres typically have an average diameter of 10 to 200 micrometers. Microspheres of smaller average diameter would tend to be unduly expensive, whereas it would be difficult to coat out a polymerizable mixture containing microspheres of larger average diameter. Typically, the average diameter of the microbubbles is within the range of 20 to 80 micrometers. The glass microspheres typically have a specific gravity of less than 1.

Polymeric foam layers having glass microspheres are particularly preferred for use herein as they will likely be less compressible than polymeric foams where voids are introduced in a different way.

The polymeric foam layer may contain further additives such as dyes, pigments, fumed silica, chopped fibers, organic and inorganic fillers, catalysts and cross-linking agents, in order to achieve specific effects.

Polymeric foams for use herein are commercially available from various suppliers such as 3M Co., Voltek, Sekisui, and others. The polymeric foam may be formed as a coextruded sheet with the pressure-sensitive adhesive composition on one or both sides of the polymeric foam layer, or the pressure-sensitive adhesive composition may be laminated to it. When the pressure-sensitive adhesive is laminated to the polymeric foam layer, it may be desirable to treat the surface of the polymeric foam layer to improve the adhesion. Such treatments are typically selected based on the nature of the materials of the pressure sensitive adhesive and of the polymeric foam layer and include primers and surface modifications (e.g., corona treatment, surface abrasion).

For a single-sided multilayer PSA assembly, the side of the polymeric foam layer surface opposite to the first pressure sensitive adhesive layer is typically coated with a suitable release material. Release materials are known and include materials such as, for example, silicones, polyethylenes, polycarbamates, polyacrylics, and the like.

According to a particular aspect of the PSA assembly, the polymeric foam layer is a second pressure sensitive adhesive layer. The composition of the polymeric foam layer as a second pressure sensitive adhesive layer may be chosen from any known PSA system.

The present disclosure is however not limited to two layered PSA assemblies. For example, the multilayer PSA assembly according to the present disclosure may also comprise three, four, five or even more superimposed layers.

In such an execution, it is further typical that the outermost layers are the pressure sensitive adhesive layer and the polymeric foam layer (in particular, as a second pressure sensitive adhesive layer). The layers sandwiched in between are referred to herewith as intermediate layer(s). In other words, in such an execution the multilayer film comprises at least one intermediate layer between the first pressure sensitive adhesive layer and the polymeric foam layer.

Accordingly, in some aspects, the multilayer PSA assembly of the present disclosure further comprises at least one intermediate layer between the pressure sensitive adhesive layer and the polymeric foam layer. Typically, the intermediate layer comprises a polymer base material selected from the group consisting of polyacrylates, polyurethanes, polyolefins, polystyrene, polyamides, natural rubbers, synthetic rubbers, polyvinylpyrrolidone, and any combinations or mixtures thereof.

In another particular aspect, the multilayer PSA assembly of the present disclosure comprises a plurality of polymeric foam layers in combination with a plurality of pressure sensitive adhesive layers. In still another particular aspect, the multilayer PSA assembly of the present disclosure comprises a central polymeric foam layer and a pressure sensitive adhesive layer on each of the major surfaces of the central polymeric foam layer. In a particular aspect, the intermediate layer comprise a polymer chosen from the group consisting of polyacrylates, polyurethanes, polyolefins, polystyrene, polyamides, natural rubbers, synthetic rubbers, polyvinylpyrrolidone, and any combinations or mixtures thereof.

However it is also possible that the intermediate layer(s) is chosen from a pressure sensitive adhesive composition as described in this disclosure for the PSA layer. The formulation of the intermediate layer(s) may be identical or different compared to the pressure sensitive adhesive layer.

Besides those materials listed above, the intermediate layer may also comprise or consist of a backing film. Suitable backing films can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like.

In a particular aspect of the multilayer PSA assembly, the pressure sensitive adhesive layer, the polymeric foam layer and/or the intermediate layer may comprise at least one filler material. Any suitable filler material commonly known in the art may be used herein. Typical examples of filler material that can be used herein include, but are not limited to, those selected from the group consisting of filler particles, microspheres, expendable microspheres, preferably pentane filled expendable microspheres or gaseous cavities, glassbeads, glass microspheres, hydrophobic silica type fillers, hydrophilic silica type fillers, fibers, electrically and/or thermally conducting particles, nano particles, and any combinations thereof. Such fillers may be used to increase the mechanical stability of the PSA film and may also increase the shear and peel force resistance.

From the filler particles set out above, expanded perlite is especially preferred. Perlite is a naturally occurring hydrated volcanic glass formed by the alteration of obsidian. Typically, perlite is composed of silicon dioxide (70-75 wt. %), aluminum oxide (12-17 wt. %), sodium oxide (3-4 wt. %), potassium oxide (3-5 wt. %), iron oxide (0.5-2 wt. %), magnesium oxide (0.2-0.7 wt. %) and calcium oxide (0.5-1.5 wt. %). Natural perlite further contains about 3-5 wt. % water.

The perlite for use herein is expanded in order to obtain very low density bubbles in the material, which is accomplished because of the presence of water in the crude perlite rock. Upon accelerated heating to above 870° C., the crude perlite rock pops in a manner similar to popcorn as the glass ore particles soften in the flame and the water in the ore turns to steam and expends forming the numerous low density bubbles previously mentioned. This process for expanding perlite is known.

In the present disclosure, expanded perlite is used in particulate form, whereas the expanded perlite particles have in particular an average diameter from 1-300 µm, in particular from 10-150 µm. Expanded perlite particles of that size are available on the market and can be produced by crushing the expanded perlite obtained by the heat treatment of perlite rock as set out above. Exemplary suitable expanded perlite particles for use herein, are commercially available under the trade designation Eurocell from Europerl, Germany.

The amounts of expanded perlite which may be added to any of the layers of the multilayer pressure sensitive adhesive assembly of the present disclosure may vary in broad ranges. The expanded perlite is typically added to the polymeric foam layer and/or the intermediate layer, especially if these layers do not have PSA characteristics. In particular, the expanded perlite content may range from 1-30 wt. % with reference to the composition of the backing layer, in particular from 2-20 wt. %. However, the present invention is not limited to the before mentioned ranges. The multilayer PSA assemblies with such contents, in particular in the polymeric foam layer, reveal especially high peel adhesion forces on LSE, MSE and HSE surfaces, and particularly on clear coat surfaces.

As set out above, expanded perlite is a porous material. The porosity ensures that the addition of such a filler material does not increase the overall weight of the PSA-film but even in the contrary may reduce the overall weight. Hence, it is preferred that the expanded perlite being used has a compacted density of 680 to 850 mL/100 g In this context, it is further preferred that the expanded perlite particles exhibit a surface modification, which is preferably chosen from hydrophobic surface modifications, like a silane surface modification and/or a hydrophilic modification like an epoxydation, amination or an acrylate functionalization. Without wishing to be bound by theory, it is believed that the hydrophobic modifications further enhance the adhesion to glass surfaces for example and may also lead to weaker interactions between the polymeric matrix and the filler and therefore to an improved deformability of the adhesive. Still without wishing to be bound by theory, it is believed that this effect leads to a better stress distribution in the adhesive layer resulting in improved peel performance especially on critical to adhere surfaces. The hydrophilic modifications may serve to improve adhesion to the polymer matrix of the layer in which the filler is incorporated. The epoxydation, amination and acrylate functionalization can be achieved by a reaction with aminosilane, epoxysilane and acrylic silanes for example.

Accordingly, in one particular aspect of the multilayer PSA assembly, the filler material comprises an aluminum silicate, which is preferably selected to be perlite, more preferably expanded perlite. In some aspects, the expanded perlite particles exhibit a surface modification, which is typically chosen from hydrophobic surface modifications and/or a hydrophilic modification. In another particular aspect of the multilayer PSA assembly, the filler material comprises expendable microspheres.

Other additives may optionally be included in the first pressure sensitive adhesive layer, the polymeric foam layer and/or the intermediate layer to change their respective properties. Such additives, include pigments, tackifiers, toughening agents, reinforcing agents, fire retardants, antioxidants, and stabilizers. The additives are added in amounts sufficient to obtain the desired end properties.

According to a typical execution, the multilayer PSA assembly is further provided on at least one of its major surfaces with a release liner. As release liner, any suitable material known to the skilled person can be used, such as e.g. a siliconized paper or siliconized polymeric film material, in particular a siliconized PET-film or a siliconized PE or PE/PP blend film material.

The thickness of the first pressure sensitive adhesive layer(s), the polymeric foam layer and the intermediate layer(s) may vary in wide ranges. For example, the thickness can be chosen independently for each layer between 25 µm and 3000 µm, between 40 µm and 3000 µm, between 50 µm and 3000 µm, between 75 µm and 2000 µm, or even between 75 µm and 1500 µm. It is however preferred that the pressure sensitive adhesive layer(s) exhibits a lower thickness compared to the intermediate and/or the polymeric foam layer. As an example, the thickness of the first PSA layer may be in the range from 20 µm to 200 µm, or even from 40 µm to 200 µm, whereas the thickness of the polymeric foam may typically be in the range from 100 µm to 4000 µm, from 400 µm to 3000 µm, or even from 800 µm to 2000 µm. Such multilayer PSA assemblies typically exhibit high peel adhesion, presumably caused by a stabilizing effect of the relatively thick polymeric foam layer compared to the first PSA layer.

The present invention is further directed to a method of manufacturing a multilayer pressure sensitive adhesive assembly according to one aspect of the disclosure, whereby the first pressure sensitive adhesive layer and the polymeric foam layer are superimposed on one another.

In one aspect of this method, the first pressure sensitive adhesive layer and the polymeric foam layer and, if desired also the intermediate layer(s), are prepared separately and afterwards laminated to each other.

In an alternative method for manufacturing a multilayer pressure sensitive adhesive assembly according to the present disclosure, a liquid precursor of the pressure sensitive adhesive layer and a liquid precursor of the polymeric foam layer and, if desired also the intermediate layer(s), are superimposed and then cured, in particular with actinic radiation such as UV, γ (gamma) or e-beam radiation or by thermal curing. This method is described in full details in WO 2011094385(A1), the content of which is herewith incorporated by reference.

However, the production of the inventive multilayer assembly is not limited to the before mentioned methods. For instance, the multilayer PSA assembly may be produced by co-extrusion, solvent-based methods or also combinations thereof.

The multilayer PSA assembly of the present disclosure can be coated/applied upon a variety of substrates to produce adhesive-coated articles. The substrates can be flexible or inflexible and be formed of a polymeric material, glass or ceramic material, metal, or combinations thereof. Suitable polymeric substrates include, but are not limited to, polymeric films such as those prepared from polypropylene, polyethylene, polyvinyl chloride, polyester (polyethylene terephthalate or polyethylene naphthalate), polycarbonate, polymethyl(meth)acrylate (PMMA), cellulose acetate, cellulose triacetate, and ethyl cellulose. Foam backings may be used. Examples of other substrates include, but are not limited to, metal such as stainless steel, metal or metal oxide coated polymeric material, metal or metal oxide coated glass, and the like.

The multilayer PSA assemblies may be used in any article conventionally known to use such assemblies such as labels, tapes, signs, covers, marking indices, display components, touch panels, and the like. Flexible backing materials having microreplicated surfaces are also contemplated.

The multilayer PSA assemblies can be coated/applied on a substrate using any conventional coating techniques modified as appropriate to the particular substrate. For example, these multilayer PSA assemblies can be applied/coated to a variety of solid substrates by methods such as roller coating, flow coating, dip coating, spin coating, spray coating knife coating, and die coating. These various methods of coating allow the multilayer PSA assemblies to be placed on the substrate at variable thicknesses thus allowing a wider range of use of the assemblies.

The multilayer PSA assemblies can be particularly useful for forming strong adhesive bonds to low surface energy (LSE) substrates. Included among such materials are polypropylene, polyethylene (e.g., high density polyethylene or HDPE), blends of polypropylene (e.g. PP/EPDM, TPO). Other substrates may also have properties of low surface energy due to a residue, such as an oil residue or a film, such as paint, being on the surface of the substrate.

However, even though the multilayer PSA assemblies bond well to low surface energy surfaces, the use of these adhesives is not limited to low surface energy substrates. The multilayer pressure-sensitive adhesives assemblies surprisingly bond well to medium surface energy (MSE) substrates such as, for example, polyamide 6 (PA6), acrylonitrile butadiene styrene (ABS), PC/ABS blends, PC, PVC, PA, PUR, TPE, POM, polystyrene, poly(methyl methacrylate) (PMMA), clear coat surfaces, in particular clear coats for vehicles like a car or coated surfaces for industrial applications and composite materials like fiber reinforced plastics.

Surprisingly still, the multilayer PSA assemblies according to the present disclosure also provide strong adhesive bond to higher surface energy (HSE) substrates such as, for example, ceramics, glasses, and metals.

Accordingly, the present disclosure is further directed to the use of a multilayer pressure sensitive adhesive assembly according to the present disclosure for the bonding, via its first pressure sensitive adhesive layer, to a low surface energy substrate, a medium surface energy substrate and/or a high surface energy substrate.

The substrate to which the multilayer PSA assembly can be applied is selected depending on the particular application. For example, the multilayer PSA assembly, via its first pressure sensitive adhesive layer can be applied to sheeting products (e.g., decorative graphics and reflective products), label stock, and tape backings. Additionally, the multilayer PSA assembly may be applied directly onto other substrates such as a metal panel (e.g., automotive panel) or a glass window so that yet another substrate or object can be attached to the panel or window. Accordingly, the multilayer PSA assembly of the present disclosure may find a particular use in the automotive manufacturing industry (e.g. for attachment of exterior trim parts or for weatherstripping), in the construction industry or in the solar panel construction industry. The multilayer PSA assembly can also be provided in the form of a pressure-sensitive adhesive transfer tape in which at least one layer of the multilayer PSA assembly is disposed on a release liner for application to a permanent substrate at a later time. The multilayer PSA assembly can also be provided as a single coated or double coated tape in which the multilayer PSA assembly is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the multilayer PSA assembly on one or both sides of the foam, or the multilayer PSA assembly be laminated to it. When the multilayer PSA assembly is laminated to the substrate, it may be desirable to treat the surface of the substrate to improve the adhesion. Such treatments are typically selected based on the nature of the materials in the multilayer PSA assembly and of the substrate and include primers and surface modifications (e.g., corona treatment and surface abrasion).

For a single-sided tape, the multilayer PSA assembly is applied to one surface of the backing material and a suitable release material is applied to the opposite surface of the backing material. Release materials are known and include materials such as, for example, silicones, polyolefins, polycarbamates, polyacrylics, and the like. For double coated tapes, the multilayer PSA assembly is applied to one surface of the backing material and a second multilayer PSA assembly is disposed on the opposite surface of the backing material. Double coated tapes are often carried on a release liner.

Item 1 is a multilayer pressure sensitive adhesive (PSA) assembly, comprising at least one first pressure sensitive adhesive layer and a (opposing or adjacent) polymeric foam layer, wherein the pressure sensitive adhesive layer comprises a pressure-sensitive adhesive composition comprising a reaction product of a polymerizable material comprising:
  (a) 2-propylheptyl acrylate as a first monomer; and optionally
  (b) a second monomer having an ethylenically unsaturated group.

Item 2 is the multilayer PSA assembly of item 1, wherein the second monomer comprises an alkyl (meth)acrylate ester, preferably a non-polar alkyl (meth)acrylate ester having an alkyl group comprising preferably from 1 to 30, more preferably from 1 to 20, even more preferably from 1 to 15 carbon atoms.

Item 3 is a multilayer PSA assembly according to any of item 1 or 2, wherein the second monomer has a glass transition temperature (Tg) of at least 20° C., in particular at least 25° C., or at least 30° C., or at least 40° C., or even at least 50° C., when formed into a homopolymer.

Item 4 is a multilayer PSA assembly according to any of the preceding items, wherein the second monomer is selected from the group consisting of methyl (meth)acrylate, tert-butyl (meth)acrylate, ethyl (meth)acrylate, n-propyl (meth)acrylate, isopropyl (meth)acrylate, iso-butyl (meth)acrylate, stearyl (meth)acrylate, phenyl (meth)acrylate, cyclohexyl (meth)acrylate, isobornyl (meth)acrylate, benzyl (meth)acrylate, isophoryl (meth)acrylate, N-vinyl caprolactam, and any combinations or mixtures thereof.

Item 5 is a multilayer PSA assembly according to any of the preceding items, wherein the second monomer is selected from the group consisting of isobornyl (meth) acrylate, cyclohexyl (meth)acrylate, isophoryl (meth)acrylate, cyclohexyl (meth)acrylate, N-vinyl caprolactam, and any combinations or mixtures thereof. More preferably, the second monomer is selected from the group of isobornyl (meth)acrylate and N-vinyl caprolactam. Even more preferably, the second monomer is selected to comprise isobornyl acrylate.

Item 6 is a multilayer PSA assembly according to any of the preceding items, wherein the polymerizable material comprises a further co-monomer which is typically selected from the group consisting of alkyl (meth)acrylate esters which are different from the second monomer, polar monomers, non-polar vinyl monomers, and any combinations or mixtures thereof.

Item 7 is a multilayer PSA assembly according to any of the preceding items, wherein the polymerizable material comprises a further co-monomer selected from the group of polar monomers, which preferably comprise an acidic group, a hydroxyl group, or a nitrogen-containing group, and wherein the acidic group is preferably a carboxyl group or a salt thereof.

Item 8 is a multilayer PSA assembly according to the item 7, wherein the further co-monomer comprises a polar monomer, preferably a polar acrylate, more preferably selected from the group consisting of acrylic acid, methacrylic acid, itaconic acid, hydroxyalkyl acrylates, acrylamides and substituted acrylamides, acrylamines and substituted acrylamines and any combinations or mixtures thereof. More preferably, the further co-monomer comprises acrylic acid.

Item 9 is a multilayer PSA assembly according to any of the preceding items, wherein the polymerizable material comprises from 50 to 99.5 weight percent, or from 60 to 90 weight percent of 2-propylheptyl acrylate as a first monomer and from 0.5 to 50 weight percent, from 1.0 to 50 weight percent, from 3.0 to 40 weight percent, from 5.0 to 35 weight percent, or even from 10 to 30 weight percent, of the second monomer, based on the total weight of polymerizable material.

Item 10 is a multilayer PSA assembly according to any of the preceding items, wherein the polymerizable material comprises at least 50 weight percent of 2-propylheptyl acrylate as a first monomer and up to 15 weight percent, or up to 10 weight percent of a polar monomer, preferably a polar acrylate, based on the total weight of polymerizable material.

Item 11 is a multilayer PSA assembly according to any of the preceding items, wherein the polymerizable material comprises at least 0.1 weight percent, at least 0.5 weight percent, at least 1 weight percent, or at least 2 weight percent, or even at least 3 weight percent, of a polar monomer, preferably a polar acrylate, based on the total weight of polymerizable material.

Item 12 is a multilayer PSA assembly according to any of the preceding items, wherein the polymerizable material comprises:
 a) from 50 to 99.5 weight percent, or from 60 to 90 weight percent, of 2-propylheptyl acrylate as a first monomer;
 b) from 1.0 to 50 weight percent, from 3.0 to 40 weight percent, from 5.0 to 35 weight percent, or even from 10 to 30 weight percent, of the second monomer having an ethylenically unsaturated group, preferably a second non-polar monomer having an ethylenically unsaturated group;
 c) from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a polar monomer, preferably a polar acrylate; and optionally
 d) a tackifying resin,
 wherein the weight percentages are based on the total weight of polymerizable material.

Item 13 is a multilayer PSA assembly according to any of the preceding items, wherein the polymerizable material further comprises a crosslinker, preferably in an amount of up to 5 weight percent, based on the total weight of polymerizable material.

Item 14 is a multilayer PSA assembly according to any of the preceding items, wherein the pressure-sensitive adhesive composition further comprises a tackifying resin, for example in an amount from 3 to 100 parts, from 3 to 80 parts, from 3 to 50 parts, from 5 to 30 parts, or even from 5 to 25 parts, per 100 parts of polymerizable material.

Item 15 is the multilayer PSA assembly according to item 14, wherein the tackifying resin is selected from the group consisting of C5-based hydrocarbon resins, C9-based hydrocarbon resins, C5/C9-based hydrocarbon resins, and any combinations or mixtures thereof.

Item 16 is the multilayer PSA assembly according to item 14, wherein the tackifying resin is selected from the group consisting of hydrogenated terpene resins, hydrogenated rosin resins, hydrogenated C5-based hydrocarbon resins, hydrogenated C9-based hydrocarbon resins, hydrogenated C5/C9-based hydrocarbon resins, and any combinations or mixtures thereof.

Item 17 is a multilayer PSA assembly according to any of the preceding items, wherein the (opposing or adjacent) polymeric foam layer comprises a polymer base material selected from the group consisting of polyacrylates, polyurethanes, polyolefins, polystyrenes, polyvinyls, natural rubbers, synthetic rubbers, polyvinylpyrrolidone and any combinations, copolymers or mixtures thereof.

Item 18 is a multilayer PSA assembly according to any of the preceding items, wherein the polymeric foam layer comprises a material selected from the group consisting of polyacrylates, and any combinations, copolymers or mixtures thereof.

Item 19 is a multilayer PSA assembly according to any of the preceding items, wherein the polymeric foam layer is a second pressure sensitive adhesive layer.

Item 20 is a multilayer PSA assembly according to any of the preceding items, wherein the polymeric foam layer is obtained by frothing techniques, preferably by whipping a gas into the polymerizable precursor composition of the polymeric foam layer.

Item 21 is a multilayer PSA assembly according to any of the preceding items, which is in the form of a skin/core multilayer pressure sensitive adhesive assembly, wherein the polymeric foam layer is the core layer of the multilayer pressure sensitive adhesive assembly and the first pressure sensitive adhesive layer is the skin layer of the multilayer pressure sensitive adhesive assembly.

Item 22 is a multilayer PSA assembly according to any of the preceding items, which further comprises a third pressure sensitive adhesive layer which is preferably adjacent to the polymeric foam layer in the side of the polymeric foam layer which is opposed to the side of the polymeric foam layer adjacent to the first pressure sensitive adhesive layer.

Item 23 is a multilayer PSA assembly according to item 22, which is in the form of a skin/core/skin multilayer pressure sensitive adhesive assembly, wherein the polymeric foam layer is the core layer of the multilayer pressure sensitive adhesive assembly, the first pressure sensitive adhesive layer is the first skin layer of the multilayer pressure sensitive adhesive assembly and the third pressure sensitive adhesive layer is the second skin layer of the multilayer pressure sensitive adhesive assembly.

Item 24 is a multilayer PSA assembly according to any of the preceding items, wherein the thickness of the first PSA layer is comprised between 20 µm and 200 µm, or between 40 µm and 200 µm, and wherein the thickness of the polymeric foam layer is comprised between 100 µm and 4000 µm, between 400 µm and 3000 µm, or even between 800 µm and 2000 µm.

Item 25 is a multilayer PSA assembly according to any of items 19 to 24, which further comprises at least one intermediate layer between the first pressure sensitive adhesive layer and/or the third pressure sensitive adhesive layer and the second pressure sensitive adhesive layer.

Item 26 is a multilayer PSA assembly according to item 25, wherein the intermediate layer comprises a polymer base material selected from the group consisting of polyacrylates, polyurethanes, polyolefins, polystyrene, polyamides, natural rubbers, synthetic rubbers, polyvinylpyrrolidone, and any combinations or mixtures thereof.

Item 27 is a multilayer PSA assembly according to any of the preceding items, wherein the first pressure sensitive adhesive layer, the (opposing) polymeric foam layer and/or the intermediate layer comprise at least one filler material which is preferably selected from the group consisting of filler particles, microspheres, expandable microspheres, preferably pentane filled expendable microspheres or gaseous cavities, glassbeads, glass microspheres, hydrophobic silica type fillers, hydrophilic silica type fillers, fibers, electrically and/or thermally conducting particles, nano particles, and any combinations thereof.

Item 28 is a multilayer PSA assembly according to item 27, wherein the filler material comprises an aluminum silicate, preferably expanded perlite.

Item 29 is a multilayer PSA assembly according to item 28, wherein the expanded perlite particles exhibit a surface modification, which is preferably chosen from hydrophobic surface modifications and/or a hydrophilic modification.

Item 30 is a multilayer PSA assembly according to item 27, wherein the at least one filler material comprises expandable microspheres.

Item 31 is a multilayer PSA assembly according to any of the preceding items, which is further provided with a release liner on at least one of its major surfaces.

Item 32 is a method of manufacturing a multilayer pressure sensitive adhesive assembly according to any of the preceding items, whereby the first pressure sensitive adhesive layer and the (opposing or adjacent) polymeric foam layer are superimposed on one another.

Item 33 is the method of item 32, whereby the first pressure sensitive adhesive layer and the polymeric foam layer are prepared separately and subsequently laminated to each other.

Item 34 is the method according to item 32, whereby a liquid precursor of the first pressure sensitive adhesive layer and a liquid precursor of the polymeric foam layer are superimposed and then cured, preferably with actinic radiation or by thermal curing.

Item 35 is the use of a multilayer pressure sensitive adhesive assembly according to any of items 1 to 31 for the bonding, via its first pressure sensitive adhesive layer, to a low surface energy substrate, a medium surface energy substrate and/or a high surface energy substrate.

The present invention is explained in more detail with the following examples. These examples are merely for illustrative purposes only and are not meant to be limiting on the scope of the appended claims.

EXAMPLES

Test Methods Applied:
90°-Peel-Test at 300 mm/min (According to Test Method, Finat No. 2):

Multilayer pressure sensitive adhesive film strips according to the present invention and having a width of 10 mm and a length >175 mm are cut out in the machine direction from the sample material.

For test sample preparation the liner is first removed from the one adhesive side and placed on an aluminium strip having the following dimension 22×1.6 cm. Then, the adhesive coated side of each multilayer PSA film strip is placed, after the liner is removed, with its adhesive side down on a clean test panel using light finger pressure. Next, the test samples are rolled twice in each direction with a standard FINAT test roller (weight 6.8 kg) at a speed of approximately 10 mm per second to obtain intimate contact between the adhesive mass and the surface. After applying the pressure sensitive adhesive film strips to the test panel, the test samples are allowed to dwell 72 hours at ambient room temperature (23° C.+/−2° C., 50% relative humidity +/−5%) prior to testing.

For peel testing the test samples are in a first step clamped in the lower movable jaw of a Zwick tensile tester (Model Z020 commercially available from Zwick/Roell GmbH, Ulm, Germany). The multilayer pressure sensitive adhesive film strips are folded back at an angle of 90° and their free ends grasped in the upper jaw of the tensile tester in a configuration commonly utilized for 90° measurements. The tensile tester is set at 300 mm per minute jaw separation rate. Test results are expressed in Newton per 10 mm (N/10 mm). The quoted peel values are the average of two 90°-peel measurements.

Static Shear Test @ 70° C. With 500 g Hanging Weights (According to Test Method, Finat No. 8):

The static shear is a measure of the cohesiveness or internal strength of an adhesive. It is measured in units of time (minutes) required to pull a standard area of adhesive sheet material from a stainless steel test panel under stress of a constant, standard load.

A multilayer PSA film strip of 10 mm width and 25 mm length is cut out in machine direction from the sample. One of the attached surface liners is then removed and the specimen placed with the non-tested side of the foam on an aluminum backing. Then the second release liner is removed and the foam is attached to the test substrate (plate), providing a bond area of 10 mm×25 mm and using light finger pressure. The standard FINAT test roller (weight 6.8 kg) is rolled twice in each direction at a speed of approximately 5 mm per second to obtain intimate contact between the adhesive mass and the substrate surface (test plate). After applying the foam strip (specimen) to the test plate, the test plate is allowed a dwell time at room temperature (23° C.+/−2° C., 50% relative humidity +/−5%) for a period of 24 h before testing.

The test panel is placed in a shear holding device. After a 10 minute dwell time at the test temperature of 70° C. for UreGloss, CC5 and stainless steel and 90° C. for VW-2K panels, the 500 g load is hung into the hole on the test panel. The timer is started. The results are recorded in minutes until failure and are the average of two shear measurements. A recorded time of "10000+" indicates that the tape does not fail after 10000 min, when the test is stopped.

Test Samples:
The adhesive tests are carried out on the following automotive clear coat panels:
UreGloss clear coat coated panels available from BASF Coatings.
CeramiClear5 coated panels available from PPG Industries.

VW 2K clear coat coated panels available from DuPont coatings.

The upper listed clear coats include acrylic resins and polyesters used alone or with mixtures of copolymers comprising hydroxy- or glycidyl-functionalities or carbamatic acid residues (groups); or copolymers of acrylic acid and methacrylic acid esters with hydroxyl groups, free acid groups and further co-monomers (e.g. styrene). Panels are cut prior to 90° peel and shear testing to the requested dimension.

Before testing, the Automotive clear coat coated panels are cleaned either with a 1:1 mixture of isopropylalcohol and distilled water in the case of UreGloss and VW 2K clear coats or with n-heptane for the CeramiClear 5 (CC5) clear coat. Test panels are then rubbed dry with a paper tissue.

Other test panels used for testing were polished stainless steel panels in accordance with Specification Afera 5001, as well as test panels made of PA6, commercially available by Rocholl GmbH, Germany.

Raw Materials Used:

In the examples, the following raw materials are used:
2-Propylheptylacrylate (2-PHA; C10-acrylate; for comparative films) is an ester of 2-propylheptanol and acrylic acid which is obtained from BASF AG, Germany. Tg-value: −68° C. 2-Propylheptylacrylate is a mixture of 2 isomers with a constant distribution. 2-Propylheptylacrylate: appr. 90%; 2-propenoic acid, 4-methyl-2-propylhexylester: appr. 10%, Purity over 99%; boiling point: 160° C., density: 0.84 g/cm3, viscosity: 2 mPas.
Isooctylacrylate is an ester of isooctylalcohol and acrylic acid which is obtained from 3M Hilden, Germany (IOA).
2-Ethylhexylacrylate (C8-acrylate, 2-EHA) is an ester of 2-ethylalcohol and acrylic acid which is obtained from BASF AG, Germany. Tg-value: −58° C.
Acrylic acid is obtained from 3M Hilden, Germany (AA).
Isobornylacrylate (SR 506D) is a monofunctional acrylic monomer with a high Tg of 66° C., it is available from Cray Valley, France.
Regalite S 7125 is a partially hydrogenated hydrocarbon resin, commercially available from Eastman Chemical BV, NL.
1,6-Hexanedioldiacrylate is a fast curing diacrylate and is obtained from 3M Hilden, Germany (HDA).
Omnirad BDK: 2,2-dimethoxy-2-phenylacetophenone is a UV-initiator and is available from iGm resins, Waalwijk Netherlands.
Eurocell 300-h (available by Europerl, Germany) is an expanded perlite, Ø particle size: 75 μm, hydrophobized with silanes.
3M Glasbubbles (K15) are hollow glassbubbles with a diameter of 115 μm, available from 3M, Germany.
Aerosil R-972 are hydrophobic fumed silica particles, available from Evonik, Germany.
GTE6212 is a laminated acrylic foam tape, thickness: 1.2 mm, commercially available by 3M Deutschland GmbH.

Preparation of the Liquid Precursors for the Pressure Sensitive Adhesive Layer (PSA Skins):

The different pressure sensitive adhesive layers used for the examples are prepared according to the method described in WO 2011094385(A1), by initially pre-polymerizing the acrylate and acrylic acid (AA) monomers in a vessel containing 0.04 ppH of Omnirad BDK as a photoinitiator and then exposing the mixture to ultraviolet radiation until a coatable syrup with a viscosity of about 7000 mPas (when measured with a Brookfield viscosimeter, T=25° C., spindle 4, 12 rpm) is obtained.

Before the UV-exposure the mixture is flushed 10 minutes with nitrogen and nitrogen is also bubbled to the mixture until the polymerization process is stopped by adding air to the syrup. All the time the mixture is stirred with a propeller stirrer (300 U/min) and the reaction is stopped when a viscosity of about 7000 mPas is reached. Additional co-monomer(s), Omnirad BDK, tackifier and HDDA crosslinker are added to the syrup and mixed until they have dissolved. The skin syrup is then coated with a lab coater as described in WO 2011094385(A1) on the bottom to the filled core with a thickness of approx. 70-90 μm. The dual layer construction is coated on 75 μm solvent free siliconized PET-liners (SLVK-Liner having a dimension of 300 mm×300 mm).

The basic pressure sensitive adhesive layers (skin formulations) used for the examples have the following compositions (in wt %) as listed in Table 1 below.

TABLE 1

| | 2-PHA | IOA | AA | IBOA | Omnirad BDK | HDDA | Regalite S-7125 |
|---|---|---|---|---|---|---|---|
| LPS 1 | 99 | | 1 | 0 | 0.2 | 0.13 | 15 |
| LPS 2 | 94 | | 6 | 0 | 0.2 | 0.13 | 15 |
| LPS 3 | 84 | | 1 | 15 | 0.2 | 0.13 | 15 |
| LPS 4 | 79 | | 6 | 15 | 0.2 | 0.13 | 15 |
| LPS 5 | 69 | | 1 | 30 | 0.2 | 0.13 | 15 |
| LPS 6 | 64 | | 6 | 30 | 0.2 | 0.13 | 15 |
| LPS 7 | 81.5 | | 3.5 | 15 | 0.2 | 0.13 | 0 |
| LPS 8 | 81.5 | | 3.5 | 15 | 0.2 | 0.13 | 15 |
| LPS 9 | 81.5 | | 3.5 | 15 | 0.2 | 0.13 | 30 |
| LPS 10 | 81.5 | | 3.5 | 15 | 0.2 | 0.13 | 45 |
| LPS 11 | | 92.5 | 7.5 | 0 | 0.2 | 0.09 | 0 |
| LPS 12 | 92.5 | | 7.5 | 0 | 0.2 | 0.09 | 0 |
| LPS 13 | 90 | | 10 | 0 | 0.2 | 0.09 | 0 |
| LPS 14 | 96.5 | | 3.5 | 0 | 0.2 | 0.11 | 0 |
| LPS 15 | 95 | | 5 | 0 | 0.2 | 0.11 | 0 |
| LPS 16 | 80.5 | | 3.5 | 16 | 0.2 | 0.11 | 0 |
| LPS 17 | 79 | | 5 | 16 | 0.2 | 0.11 | 0 |
| LPS 18 | 76.5 | | 7.5 | 16 | 0.2 | 0.11 | 0 |
| LPS 19 | 74.0 | | 10 | 16 | 0.2 | 0.11 | 0 |

Preparation of the Liquid Precursor for the Opposing Polymeric Layer (Foam Layer):

Liquid Precursor Foams (LPF 1-3):

The liquid precursors of the foam layer, later referred to as LPF 1-3, are prepared by combining the C8 acrylate (either IOA or 2-EHA) and the acrylic acid (between 10-12.5 wt %) with 0.04 pph of Omnirad as a photoinitiator in a glass vessel. Before the UV exposure is initiated the mixture is flushed 10 minutes with nitrogen and nitrogen is also bubbled into the mixture the whole time until the polymerization process is stopped by adding air to the syrup. All the time the mixture is stirred with a propeller stirrer (300 U/min) and the reaction is stopped when a viscosity comprised between 3000 and 4500 mPas is reached (when measured with a Brookfield viscosimeter, T=25° C., spindle 4, 12 rpm). Additional the remaining amount of Omnirad BDK, the HDDA crosslinker, the glass bubbles K15, the fumed silica (LPF 1) and in case of LPF 3, 6 pph Eurocell 300-h are added to the syrup and mixed until they have dissolved/dispersed. The exact formulations of the liquid precursors for the opposing polymeric layers are listed in Table 2 below.

TABLE 2

|  | Liquid Precursor Foam 1 (LPF 1) | Liquid Precursor Foam 2 (LPF 2) | Liquid Precursor Foam 3 (LPF 3) |
|---|---|---|---|
| IOA |  | 87.5 |  |
| 2-EHA | 90 |  | 90 |
| AA | 10 | 12.5 | 10 |
| HDDA | 0.1 | 0.09 | 0.1 |
| Omnirad BDK | 0.25 | 0.025 | 0.25 |
| Eurocell 300-h |  |  | 6 |
| Aerosil R-972 | 3 | 1 |  |
| Glass Bubbles K15 | 6 | 9.3 | 6 |

The liquid precursor formulations are superimposed on one another as described in WO 2011094385(A1) in a lab coater. The knife height setting is 130-140 μm for the first knife (for the pressure sensitive adhesive layer) and 1240-1250 μm for the second knife (for the opposing (foam) layer).

The lab coater is connected to a UV curing station of 3 m length, where zones of different UV-intensities can be realized. The UV-radiation cures the tape from both its top and bottom side. Hereby in all zones the intensity from top and bottom side is set at equal levels. The total radiation intensities (top+bottom) and the length of the different zones are listed in Table 3.

TABLE 3

UV Intensity of the Lab coater curing station

|  | Zone 1 Length (200 cm) | Zone 2 Length (100 cm) |
|---|---|---|
| Total intensity [mW(cm2] | 2.07 | 4.27 |

Table 4 provides an overview of the examples made of a pressure sensitive layer made from any of the liquid precursors LPS 1-LPS 19 and an opposing polymeric (foam) layer derived from LPF 1-LPF3.

TABLE 4

| Example No. | Liquid precursor PSA layer (skin layer) | Liquid precursor opposing layer (foam layer) |
|---|---|---|
| 1 | LPS1 | LPF1 |
| 2 | LPS2 | LPF1 |
| 3 | LPS3 | LPF1 |
| 4 | LPS4 | LPF1 |
| 5 | LPS5 | LPF1 |
| 6 | LPS6 | LPF1 |
| 7 | LPS7 | LPF1 |
| 8 | LPS8 | LPF1 |
| 9 | LPS9 | LPF1 |
| 10 | LPS10 | LPF1 |
| 11 | LPS11 | LPF2 |
| 12 | LPS12 | LPF2 |
| 13 | LPS13 | LPF2 |
| 14 | LPS14 | LPF3 |
| 15 | LPS15 | LPF3 |
| 16 | LPS16 | LPF3 |
| 17 | LPS17 | LPF3 |
| 18 | LPS18 | LPF3 |
| 19 | LPS19 | LPF3 |

Effect of the Acrylic Acid (Co-Monomer) on Medium/High Energy Substrates:

The 90°-peel measurements are tested to PA6 panels as well as stainless steel panels with a dwell time of 72 hours and at a peel rate of 300 mm/min. Static shear measurements are tested with a dwell time of 24 h on stainless steel panels at 70° C. with 500 g hanging weights and at room temperature (23° C.+/−2° C.) with 1000 g hanging weights. All dual layer PSA films are produced using the method as described in WO 2011094385(A1) with an overall thickness of approximately 1200 μm. The results are shown in the following Tables 5 and 6.

TABLE 5

90° peel on PA6 & stainess steel panels in N/cm.

| Example No | PA6 | Stainless Steel |
|---|---|---|
| 3 | 25 | 20 |
| 8 | 30 | 33 |
| 4 | 34 | 56 |

The influence of the acrylic acid can be clearly seen. By constant IBOA content of 15 wt %, the peel increases on both substrates with increasing AA content from example 3 (1 wt % AA) to example 8 (3.5 wt % AA) all the way to example 4 (with 6 wt % AA). Hereby, the effect can be even better observed on the stainless steel panels where the increase of the AA content by 5 wt % between example 3 and example 4 brings a peel increase of over 100%.

TABLE 6

Static Shear on stainless steel (min).

| Example No | Static shear at 23° C., 1000 g weight (min) | Static Shear at 70° C., 500 g weight (min) |
|---|---|---|
| 3 | 3382 | 4950 |
| 8 | 10000+ | 6000 |
| 4 | 10000+ | 6000 |

Also here, the increase of the static shear values in correlation to the increase of the AA content can be clearly seen.

Effect of the Second Monomer (IBOA) on Peel and Static Shear Behavior to Medium/High Energy Substrates:

The effect of the second monomer on the 90° peel behavior is shown in Table 7.

TABLE 7

90° Peel to PA6 and SS.

| Example No. | 90° Peel (to PA6) in N/cm | 90° Peel to stainless steel (SS) in N/cm |
|---|---|---|
| 1 | 18 | 17 |
| 3 | 25 | 20 |
| 5 | 25 | 26 |
| 2 | 25 | 37 |
| 4 | 34 | 56 |
| 6 | 41 | 67 |

The examples with low acid content (examples 1, 3 and 5) and example 2, which has a 6 wt % AA content without any second monomer, all stay at a 90° peel value below 30N/cm.

When further looking at examples 2, 4 and 6 (6 wt % AA), there is a significant correlation between the increase of IBOA content and the increase in peel behavior. This shows that besides the strong effect of the AA on its own, the second monomer can help provide an acceleration of peel behavior when combined with a sufficient amount of AA. The influence of the IBOA content on the static shear values is listed in Table 8.

TABLE 8

Static Shear at RT and 70° C.

| Example No. | Static Shear to stainless steel (SS), room temperature (23° C. +/− 2°) in min | Static Shear to stainless steel (SS) at 70° C. in min |
|---|---|---|
| 1 | 918 | 1791 |
| 3 | 3382 | 4950 |
| 5 | 2142 | 6000 |
| 2 | 10000+ | 6000 |
| 4 | 10000+ | 6000 |
| 6 | 10000+ | 6000 |

The increase of shear performance through IBOA addition can be best seen on the examples with low acid content. In case of examples 2, 4 and 6, all having 6 wt % AA content, the strong effect of AA on the shear already dominates the performance increase through IBOA.

Effect of the Tackifier on Peel and Shear Behavior on Medium/High Energy Substrates:

The effect of the tackifier on the 90° peel values is demonstrated in Table 9.

TABLE 9

90° peel to PA6 and SS

| Example No | 90° Peel (to PA6) in N/cm | 90° Peel to stainless steel (SS) in N/cm |
|---|---|---|
| 7 | 23 | 23 |
| 8 | 30 | 33 |
| 9 | 37 | 52 |
| 10 | 63 | 65 |

A clear increase of the peel behavior can be observed with increasing the tackifier content. By addition of 15 phr tackifier there is an increase of 7 N/cm from 0 to 15 phr and again from 15 to 30 phr. The most significant increase is achieved with tackifier additions between 30 to 45 phr.

The influence of tackifier loadings on static shear performances can be seen in Table 10.

TABLE 10

Static Shear at RT and 70° C.

| Example No. | Static Shear to stainless steel (SS), room temperature (23° C. +/− 2°) in min | Static Shear to stainless steel (SS) at 70° C. in min |
|---|---|---|
| 7 | 580 | 6000 |
| 8 | 10000+ | 6000 |
| 9 | 10000+ | 4286 |
| 10 | 2808 | 88 |

Shear values reach preferred ranges of 10000+ min at tackifier loading between 15 to 30 phr. Is the tackifier loading quite high, as is the case for example 10, then the shear values drop significantly as the pressure sensitive adhesive layer becomes too viscous (soft) and the inner cohesion of the first pressure sensitive adhesive layer is weakened.

Summarizing the 90° peel and static shear behavior of examples 1 to 10 to medium/high energy substrates it can be clearly seen that the acrylic acid effect is stronger than that of the second monomer (IBOA). However the AA/IBOA content of a formulation enhance each other well, at a minimum selected AA content. Further improvements to peel and shear performance can be obtained by using tackifiers in loadings high enough to ensure good peel behavior but still low enough to reach static shear results of 10000+ min to stainless steel at room temperature.

Effect of 2-PHA Versus an C8 Acrylate (IOA):

In order to study the effect of 2-PHA versus a C8 acrylate, without any side effects caused by the additions of second monomers and/or tackifiers, examples 11 to 13 are made. These use respectively liquid precursors LPS 11 to 13 for making the first pressure sensitive adhesive layer. The pressure-sensitive adhesive layers are superimposed on a opposing layer obtained from liquid precursor LPF 2, which has a higher level of acrylic acid (AA) and more glass bubbles as the formerly used LPF1 (for examples 1-10).

Table 11 shows the 90° peel values and the static shear results obtained to stainless steel (SS) at room temperature (23° C.+/−2° C.).

TABLE 11

90° Peel on PA6 and SS & Static Shear at RT.

| Example No. | 90° Peel (to PA6) in N/cm | 90° Peel to stainless steel (SS) in N/cm | Static Shear to stainless steel (SS), room temperature (23° C. +/− 2°) in min |
|---|---|---|---|
| 11 | 18 | 21 | 10000+ |
| 12 | 21 | 30 | 10000+ |

On PA6 there is a positive effect of 2-PHA over IOA to be seen (+3N/cm). This effect even increases on stainless steel (+40% increase). The conclusion that can be drawn from Table 11 is that using 2-PHA instead of IOA leads to an improved peel behavior.

Effect of Acrylic Acid and IBOA (2nd Monomer) on 90° Peel Behavior and Static Shear Results on Clear Coats with Various Surface Energies:

The 90°-peel measurements are tested on the automotive clear coats UreGloss, Cerami Clear5 and VW2K after a dwell time of 72 hours at a peel rate 300 mm/min. Static shear measurements are tested with a dwell time of 24 h on UreGloss at 70° C. with 500 g hanging weights and on VW2K at 90° C. with 500 g hanging weights. The 90° peel results are shown in the following Table 12. Static shear results are not listed in a separate table, as all of the examples 14-19 have shear hanging times of 10000+ minutes on UreGloss and VW2K and therefore provide evidence, that the use of 2-PHA increases the internal strength of the pressure-sensitive adhesive layer independent of the AA content or the second monomer content.

All dual layer PSA films for examples 14-19 are produced using the method as described in WO 2011094385(A1) with an overall thickness of 1200 µm.

Table 12 shows the influence of the AA and IBOA content on 90° peel behavior to low surface energy clear coats.

TABLE 12

90° Peel to UreGloss, CC5 and VW2K.

| Example No | 90° Peel to UreGloss in N/cm | 90° Peel to CC5 in N/cm | 90° Peel to VW2K in N/cm |
|---|---|---|---|
| 14 | 16.6 | 23.9 | 30 |
| 15 | 16.8 | 24.8 | 33.4 |
| 16 | 19.1 | 25.1 | 39.5 |
| 17 | 15.2 | 24 | 32.9 |
| 18 | 12.8 | 19.9 | 28 |
| 19 | 12.2 | 21.5 | 31.7 |
| GTE6212 | 15.8 | 19.5 | 27.7 |

Generally peel values increase from UreGloss, to CeramiClear5 up to VW2K. High Loadings of AA (7.5/10 wt %) will decrease the peel values on difficult to bond to clear coats. As in examples 14 to 17, AA contents of 5 wt % and lower are preferred for these surfaces. Example 16 finally shows the best peel values on all clear coats with low AA content and IBOA as a comonomer. The effect of the AA content can however be seen as quite limited when comparing examples 14 and 15. Only a slight increase can be noted between these examples.

The influence of the addition of IBOA is however nicely observed when comparing examples 14 and 16, which both have 3.5 wt % AA. Example 16 shows a peel increase of 9.5 N/cm with a 16 wt % addition of IBOA versus example 14, which does not contain any IBOA. This positive effect of the IBOA however again decreases when the AA content is set higher on clear coats. The comparison of examples 15 and 17 (with both 5 wt % AA), which only differ by the 16 wt % addition of IBOA to example 17, show that the peel enhancing effect of IBOA comes to a halt at a AA content around 5 wt %. Examples 18 and 19 show that even higher AA loadings (7.5 wt % and 10 wt %) in the pressure-sensitive adhesive layer will further decrease 90° peel adhesion results especially on low energy surfaces like UreGloss. Values on surfaces with slightly higher surface energies like the VW2K clear coat still show good peel adhesion values.

The results obtained with comparative example GTE 6212, which is a commercially available acrylic foam tape from 3M, clearly show the improvement obtained with the formulation of example 16, based on a combination of 2-PHA, a low AA content and the addition of a second monomer.

The invention claimed is:

1. A multilayer PSA assembly comprising:
   i. a propylheptyl acrylate adhesive copolymer layer comprising:
      a) from 50 to 99.5 weight percent of 2-propylheptyl acrylate as a first monomer;
      b) from 1.0 to 50 weight percent of a second monomer selected from isobornyl (meth)acrylate, cyclohexyl (meth)acrylate, isophoryl (meth)acrylate, N-vinyl caprolactam, and any combinations or mixtures thereof;
      c) from 0.1 to 15 weight percent of a third monomer selected from acrylic acid, methacrylic acid, itaconic acid, hydroxyalkyl acrylates, acrylamides, substituted acrylamides, acrylamines, substituted acrylamines, and any combinations or mixtures thereof; and
      d) a tackifying resin in an amount from 5 to 30 parts per 100 parts of the copolymer, wherein the tackifying resin is selected from the group consisting of C5-based hydrocarbon resins, C9-based hydrocarbon resins, C5/C9-based hydrocarbon resins, and any combinations or mixtures thereof;
      wherein the weight percentages are based on the total weight of the copolymer; and
   ii. a second acrylate pressure sensitive adhesive foam layer.

2. The multilayer PSA assembly of claim 1, wherein the copolymer material further comprises a crosslinker, in an amount of 0.01 to 5 weight percent, based on the total weight of the copolymer.

3. The multilayer PSA assembly of claim 1 in the form of a skin/core multilayer pressure sensitive adhesive assembly, wherein the acrylate pressure sensitive adhesive foam layer (ii) is the core layer and the propylheptyl acrylate adhesive layer is a skin layer.

4. The multilayer PSA assembly of claim 3, which further comprises a third pressure sensitive adhesive layer which is adjacent to the acrylate pressure sensitive adhesive foam layer on the side of which is opposed to the propylheptyl acrylate adhesive layer.

5. The multilayer PSA assembly of claim 4, which further comprises at least one intermediate layer between the propylheptyl acrylate adhesive layer and/or the third pressure sensitive adhesive layer and the foam layer.

6. The multilayer PSA assembly of claim 1 wherein the second acrylate pressure sensitive adhesive foam layer comprises at least one filler material selected from the group consisting of filler particles, expanded perlite, microspheres, expandable microspheres, glass beads, glass microspheres, hydrophobic silica type fillers, hydrophilic silica type fillers, fibers, electrically and/or thermally conducting particles, nanoparticles, and any combinations thereof.

7. The multilayer PSA assembly of claim 6, wherein the filler material comprises expanded perlite.

8. The multilayer PSA assembly of claim 6 wherein the filler material comprises expandable microspheres.

9. The multilayer PSA assembly of claim 1, which is further provided with a release liner on at least one of its major surfaces.

10. The multilayer PSA assembly of claim 1 wherein the second acrylate pressure sensitive adhesive foam layer is crosslinked.

11. The multilayer PSA assembly of claim 1, wherein the copolymer comprises from 0.1 to 10 weight percent of the third monomer, based on a total weight of copolymer.

12. A multilayer PSA assembly comprising:
   i. a propylheptyl acrylate adhesive copolymer layer comprising:
      a) from 50 to 99.5 weight percent of 2-propylheptyl acrylate;
      b) from 1.0 to 50 weight percent of isobornylacrylate;
      c) from 0.1 to 15 weight percent of a monomer selected from acrylic acid, hydroxybutyl acrylate, and any combination or mixture thereof; and
      d) an optional tackifying resin;
      wherein the weight percentages are based on the total weight of the copolymer;
      wherein the copolymer material further comprises a crosslinker, in an amount of 0.01 to 5 weight percent, based on the total weight of the copolymer;
   and
   ii. a second acrylate pressure sensitive adhesive foam layer.

13. The multilayer PSA assembly according to claim 12, wherein the propylheptyl acrylate adhesive copolymer layer additionally comprises the tackifying resin in an amount from 5 to 30 parts per 100 parts of the copolymer, wherein the tackifying resin is selected from the group consisting of C5-based hydrocarbon resins, C9-based hydrocarbon resins, C5/C9-based hydrocarbon resins, and any combinations or mixtures thereof.

14. A multilayer PSA assembly comprising:
   i. a propylheptyl acrylate adhesive copolymer layer comprising:
      a) from 60 to 90 weight percent of 2-propylheptyl acrylate;
      b) from 10 to 30 weight percent of isobornylacrylate;
      c) from 3.0 to 6.0 weight percent of a monomer selected from acrylic acid, hydroxybutyl acrylate, and any combination or mixture thereof; and d) 0.05 to 1 weight percent of a crosslinker;
wherein the weight percentages are based on the total weight of the copolymer;
and
ii. a second acrylate pressure sensitive adhesive foam layer.

15. The multilayer PSA assembly according to claim 14, wherein the propylheptyl acrylate adhesive copolymer layer additionally comprises a tackifying resin in an amount from 5 to 30 parts per 100 parts of the copolymer, wherein the tackifying resin is selected from the group consisting of C5-based hydrocarbon resins, C9-based hydrocarbon resins, C5/C9-based hydrocarbon resins, and any combinations or mixtures thereof.

* * * * *